United States Patent
Davie et al.

(10) Patent No.: US 9,926,212 B2
(45) Date of Patent: Mar. 27, 2018

(54) HIGH VELOCITY CROSS FLOW DYNAMIC MEMBRANE FILTER

(71) Applicant: PRO-Equipment, Inc., Waukesha, WI (US)

(72) Inventors: Richard Davie, Eagle, WI (US); Ingchen Douglas Hwang, Waukesha, WI (US); Ludek Zatopek, Waukesha, WI (US); Karel Vokurka, Brno (CZ)

(73) Assignee: PRO-EQUIPMENT, INC., Waukesha, WA (US)

( * ) Notice: Subject to any disclaimer, the term of this patent is extended or adjusted under 35 U.S.C. 154(b) by 124 days.

(21) Appl. No.: 14/974,631

(22) Filed: Dec. 18, 2015

(65) Prior Publication Data

US 2016/0175779 A1    Jun. 23, 2016

Related U.S. Application Data

(60) Provisional application No. 62/095,356, filed on Dec. 22, 2014.

(51) Int. Cl.
*B01D 61/22*    (2006.01)
*B01D 61/18*    (2006.01)
(Continued)

(52) U.S. Cl.
CPC .............. *C02F 1/44* (2013.01); *B01D 61/18* (2013.01); *B01D 61/22* (2013.01); *B01D 63/084* (2013.01);
(Continued)

(58) Field of Classification Search
None
See application file for complete search history.

(56) References Cited

U.S. PATENT DOCUMENTS

| 4,243,536 A | 1/1981 | Prolss |
| 4,698,156 A | 10/1987 | Bumpers |

(Continued)

FOREIGN PATENT DOCUMENTS

| CN | 1777470 | 5/2006 |
| EP | 0284404 | 9/1988 |

(Continued)

OTHER PUBLICATIONS

Chinese Patent Office Action for Application No. 201580002643.2 dated May 24, 2017 (11 pages—including translation).

(Continued)

*Primary Examiner* — Krishnan S Menon
(74) *Attorney, Agent, or Firm* — Michael Best & Friedrich LLP

(57) ABSTRACT

A high velocity cross flow dynamic membrane filtration system includes a disc membrane assembly having a frame and at least two support shafts. Each support shaft defines a longitudinal axis about which is positioned a plurality of axially spaced membrane discs, with each shaft further coupled to the frame. A permeate tube is coupled to each support shaft and in fluid communication with the membrane discs associated with that support shaft. A vessel defines a treatment chamber and is configured to removably support the disc membrane assembly within the treatment chamber. The vessel further includes a wall. The filtration system also includes a drive system. The permeate tubes are configured to extend through a portion of the vessel wall when the disc membrane assembly is positioned within the treatment chamber. The permeate tubes are further configured for rotation by the drive system.

17 Claims, 18 Drawing Sheets

(51) Int. Cl.
*B01D 63/08* (2006.01)
*B01D 63/16* (2006.01)
*C02F 1/44* (2006.01)
*C02F 1/66* (2006.01)
*B01D 65/08* (2006.01)

(52) U.S. Cl.
CPC ............ *B01D 63/16* (2013.01); *B01D 65/08* (2013.01); *B01D 2315/02* (2013.01); *B01D 2315/10* (2013.01); *C02F 1/66* (2013.01); *C02F 2209/005* (2013.01); *C02F 2209/02* (2013.01); *C02F 2209/06* (2013.01); *C02F 2209/40* (2013.01); *C02F 2209/42* (2013.01)

(56) References Cited

U.S. PATENT DOCUMENTS

| | | | |
|---|---|---|---|
| 4,728,424 A * | 3/1988 | Miura | B01D 29/39 |
| | | | 210/331 |
| 4,818,401 A | 4/1989 | Lawrence | |
| 4,925,557 A | 5/1990 | Ahlberg, Jr. et al. | |
| 4,964,987 A | 10/1990 | Johnson | |
| 5,073,262 A | 12/1991 | Ahlberg et al. | |
| 5,100,551 A * | 3/1992 | Pall | B01D 29/41 |
| | | | 210/346 |
| 5,137,637 A | 8/1992 | Korin | |
| 5,143,630 A | 9/1992 | Rolchigo | |
| 5,254,250 A | 10/1993 | Rolchigo et al. | |
| 5,376,263 A | 12/1994 | Fischel | |
| 5,454,947 A | 10/1995 | Olapinski et al. | |
| 5,458,774 A | 10/1995 | Mannapperuma | |
| 5,707,517 A | 1/1998 | Rolchigo et al. | |
| 6,106,713 A | 8/2000 | Miller et al. | |
| 6,165,365 A | 12/2000 | Salyer et al. | |
| 6,558,545 B1 | 5/2003 | Bläse et al. | |
| 6,692,232 B1 | 2/2004 | Letourneau | |
| 6,805,806 B2 | 10/2004 | Arnaud | |
| 6,808,634 B1 | 10/2004 | Zegg | |
| 7,037,429 B2 | 5/2006 | Schliebmann et al. | |
| 7,264,716 B2 | 9/2007 | Johnson et al. | |
| 7,276,155 B1 | 10/2007 | Ricketts | |
| 7,285,212 B2 | 10/2007 | Arnaud | |
| 7,396,462 B2 | 7/2008 | Kuo | |
| 7,396,464 B2 | 7/2008 | Sternad et al. | |
| 7,638,050 B2 | 12/2009 | Kuo | |
| 7,811,449 B2 | 10/2010 | Warrow | |
| 8,501,025 B2 | 8/2013 | Hashizume et al. | |
| 2002/0060182 A1 * | 5/2002 | O'Connell | B01D 29/111 |
| | | | 210/443 |
| 2003/0155292 A1 | 8/2003 | Zegg et al. | |
| 2004/0000514 A1 * | 1/2004 | Gabl | B01D 29/111 |
| | | | 210/347 |
| 2006/0138039 A1 | 6/2006 | Rudolf et al. | |
| 2007/0056895 A1 | 3/2007 | Zegg et al. | |
| 2009/0114587 A1 | 5/2009 | Kuo | |
| 2011/0263009 A1 | 10/2011 | Vellinga et al. | |
| 2012/0020847 A1 | 1/2012 | Jones | |
| 2012/0132595 A1 | 5/2012 | Bornia | |
| 2013/0043180 A1 | 2/2013 | Freter et al. | |
| 2013/0175208 A1 | 7/2013 | Madsen et al. | |
| 2013/0186824 A1 | 7/2013 | Harris et al. | |
| 2014/0102972 A1 | 4/2014 | Lueer | |

FOREIGN PATENT DOCUMENTS

| | | | |
|---|---|---|---|
| EP | 0993853 | 4/2000 | |
| GB | 1509755 A * | 5/1978 | ............ B01D 29/39 |

OTHER PUBLICATIONS

International Search Report and Written Opinion for Application No. PCT/US2015/066717 dated Apr. 12, 2016 (14 pages).

* cited by examiner

HIGH VELOCITY CROSS FLOW DYNAMIC MEMBRANE FILTER

CROSS-REFERENCE TO RELATED APPLICATIONS

This application claims priority to U.S. Provisional Patent Application No. 62/095,356, filed Dec. 22, 2014, the entire content of which is incorporated herein by reference.

BACKGROUND

The present disclosure relates to liquid membrane filtration and, more particularly, to a high velocity cross flow dynamic membrane filter system and subsystem.

Currently, high pressure membrane systems pump feed water at a sufficiently high velocity across a filtration membrane to hinder the development of precipitated material on the membrane surface, i.e., 'plugging' of the membrane. Achieving benefits of membrane filtration while maintaining high cross flow velocities by pumping requires a substantial amount of energy.

SUMMARY

In one embodiment a high velocity cross flow dynamic membrane filtration system includes a disc membrane assembly having a frame and at least two support shafts. Each support shaft defines a longitudinal axis about which is positioned a plurality of axially spaced membrane discs, with each shaft further coupled to the frame. A permeate tube is coupled to each support shaft and in fluid communication with the membrane discs associated with that support shaft. A vessel defines a treatment chamber and is configured to removably support the disc membrane assembly within the treatment chamber. The vessel further includes a wall. The filtration system also includes a drive system. The permeate tubes are configured to extend through a portion of the vessel wall when the disc membrane assembly is positioned within the treatment chamber. The permeate tubes are further configured for rotation by the drive system.

In one embodiment a high velocity cross flow dynamic membrane filtration system includes a disc membrane assembly having a first support shaft and a second support shaft. Each support shaft defines a longitudinal axis about which is positioned a plurality of axially spaced membrane discs. A vessel defines a treatment chamber and is configured to support the disc membrane assembly within the treatment chamber. At least one plate is coupled to the vessel or to the disc membrane assembly such that the at least one plate extends at least partially between the plurality of axially spaced membrane discs of the first support shaft and the plurality of axially spaced membrane discs of the second support shaft when the disc assembly is positioned within the treatment chamber.

In one embodiment a disc membrane assembly includes a frame including a first support portion at a first end, a second support portion at a second end, first and second bearings located at the first support portion, first and second bearings located at the second support portion, and a plurality of rail members extending from the first end to the second end. A first support shaft and a second support shaft each define a longitudinal axis about which is positioned a plurality of axially spaced membrane discs. A permeate tube is coupled to each support shaft and in fluid communication with the membrane discs associated with that support shaft. The permeate tube of the first shaft is supported by the first bearing located at the first support portion and by the first bearing located at the second support portion. The permeate tube of the second shaft is supported by the second bearing located at the first support portion and by the second bearing located at the second support portion.

In one embodiment a method of operating a high velocity cross flow dynamic membrane filtration system includes feeding a fluid stream into a pressure vessel, the vessel defining a treatment chamber containing a disc membrane assembly having a first support shaft and a second support shaft, with each support shaft defining a longitudinal axis about which is positioned a plurality of axially spaced membrane discs. The method also includes distributing the fluid stream over at least a portion of the disc membrane assembly. The method further includes discharging a first portion of the fluid stream from the vessel. The method additionally includes discharging a second portion of the fluid stream from the vessel. The method also includes rotating the first support shaft and the second support shaft in a first direction, the rotating including modulating a rotation rate in response to the flow rate of the second portion of the fluid stream.

In one embodiment a disc membrane assembly includes a support shaft defining a longitudinal axis about which is positioned a plurality of axially spaced membrane discs, with each membrane disc including a disc body presenting a first surface and an opposing second surface. A first permeate carrier is in direct contact with the first surface and a second permeate carrier is in direct contact with the second surface. A first filtration membrane is in direct contact with the first permeate carrier and a second filtration membrane is in direct contact with the second permeate carrier.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
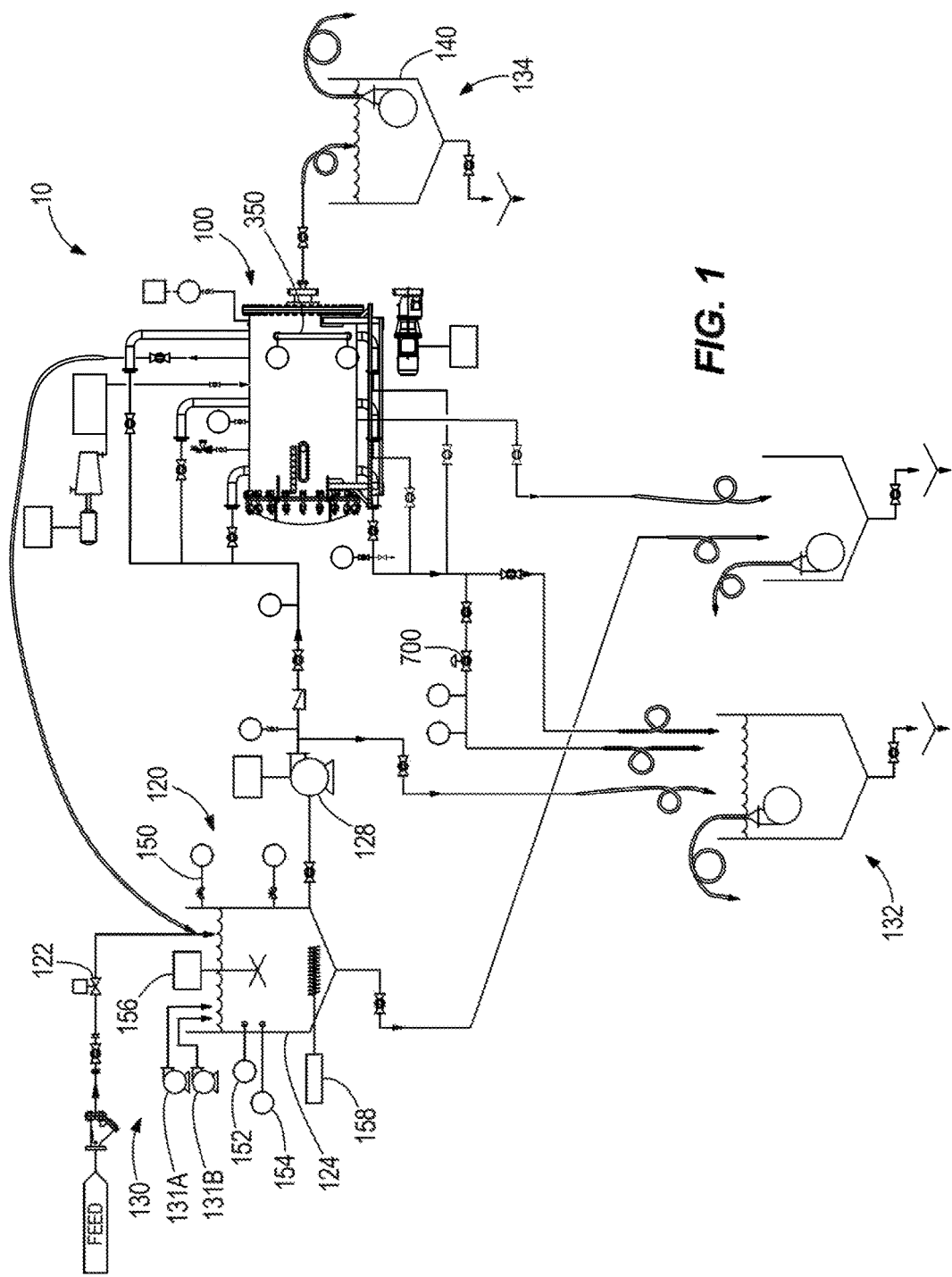
FIG. 1 is a schematic of a cross flow membrane treatment system.

FIG. 1 is a schematic of a cross flow dynamic membrane treatment system 10 having a high velocity cross flow membrane subsystem 100. The system 10 also includes a support system 120 with a feed valve 122, a feed tank 124, a feed pump 128, a chemical supply system 130 comprising a caustic chemical pump 131A and an acid chemical pump 131B, a retentate system 132, and a permeate collection system 134, to include a permeate tank 140, which stores permeate for subsequent end use, and in some embodiments a permeate transfer pump (not shown). The feed tank 124 may include a level sensor 150, a temperature sensor 152, and a pH sensor 154, a mixer 156, and a heater 158. Other fluid transfer components, such as transfer and recirculation pumps, along with associated piping, valving, and metering devices, may be included in system 10 but need not be specifically described. The support system 120 can include a local control panel (not shown) or a remote control panel in communication with the electrical and electronic components of the membrane subsystem 100, as well as the components of system 10 (see FIG. 1). The control panel houses an electrical panel and further includes, among other things, a programmable logic controller (PLC), motor starters, variable frequency drives (VFDs), and a user interface, such as a touch screen HMI (Human-Machine Interface) and/or manual switches, knobs, and indicator lights.

Figure 2:
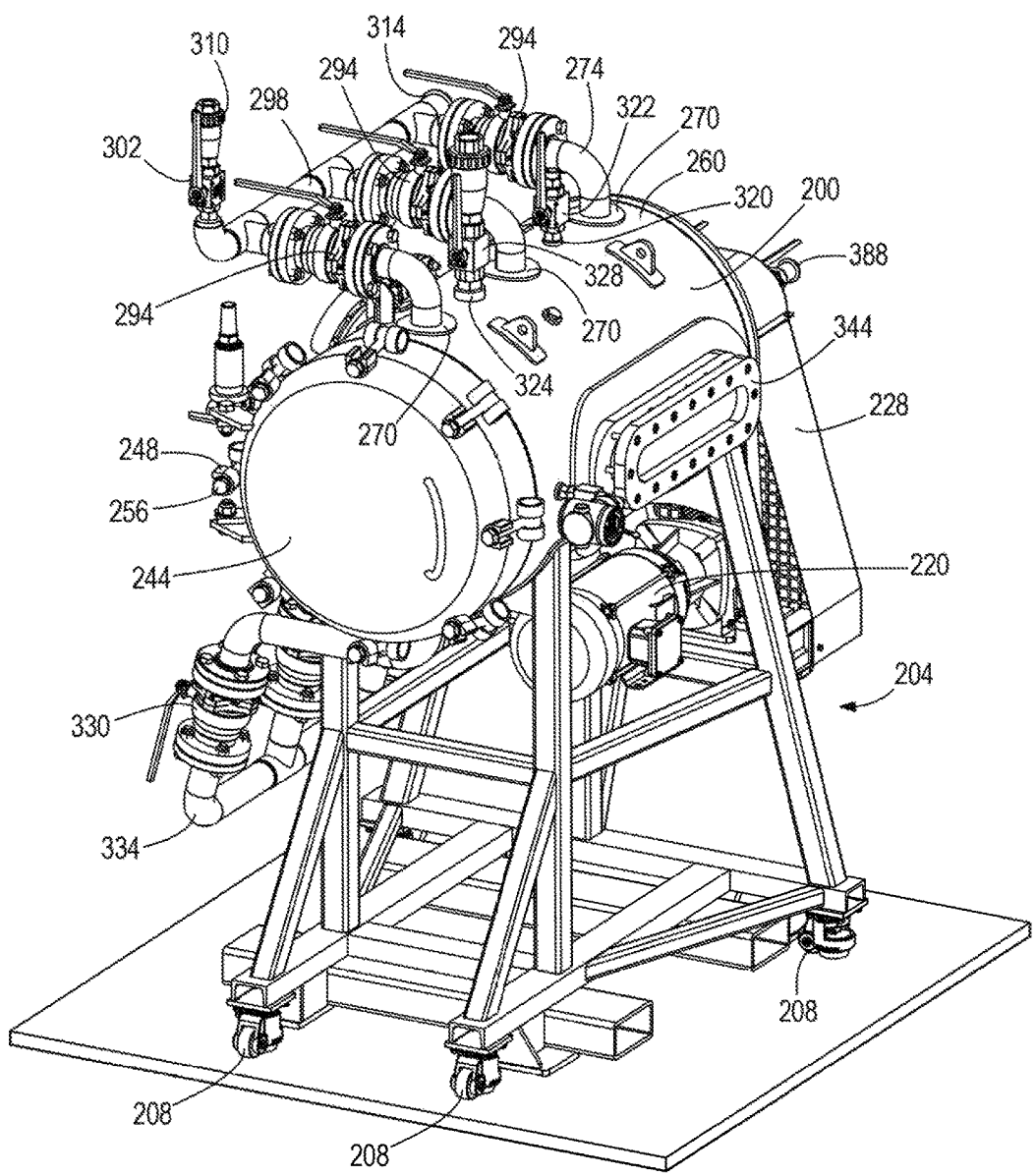
FIG. 2 is a perspective view of a cross flow membrane subsystem of the treatment system of FIG. 1.
Figure 3:
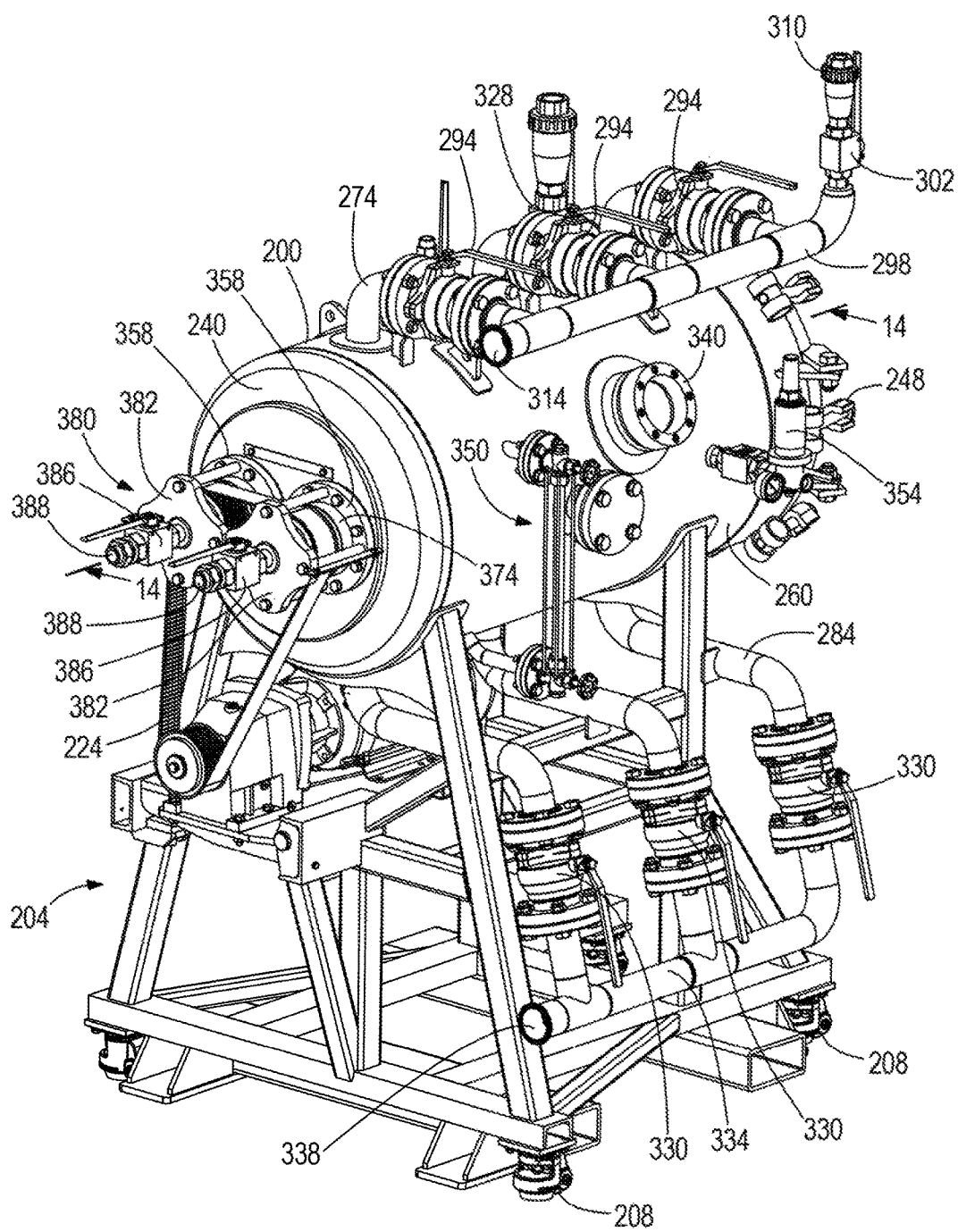
FIG. 3 is another perspective view of the cross flow membrane subsystem of FIG. 2.

Referring to FIGS. 2 and 3, the high velocity cross flow membrane subsystem 100 includes a pressure vessel 200 supported by a mobile support frame 204 itself supported by wheels or casters 208. A drive in the form of a motor 220 is fixedly attached to the support frame 204, controlled through the control panel and VFD, and operably connected to a drive belt 224 contained within a belt guard 228. In other embodiments, pneumatic or hydraulic drives can be used in place of a variable electric drive.

Figure 4:
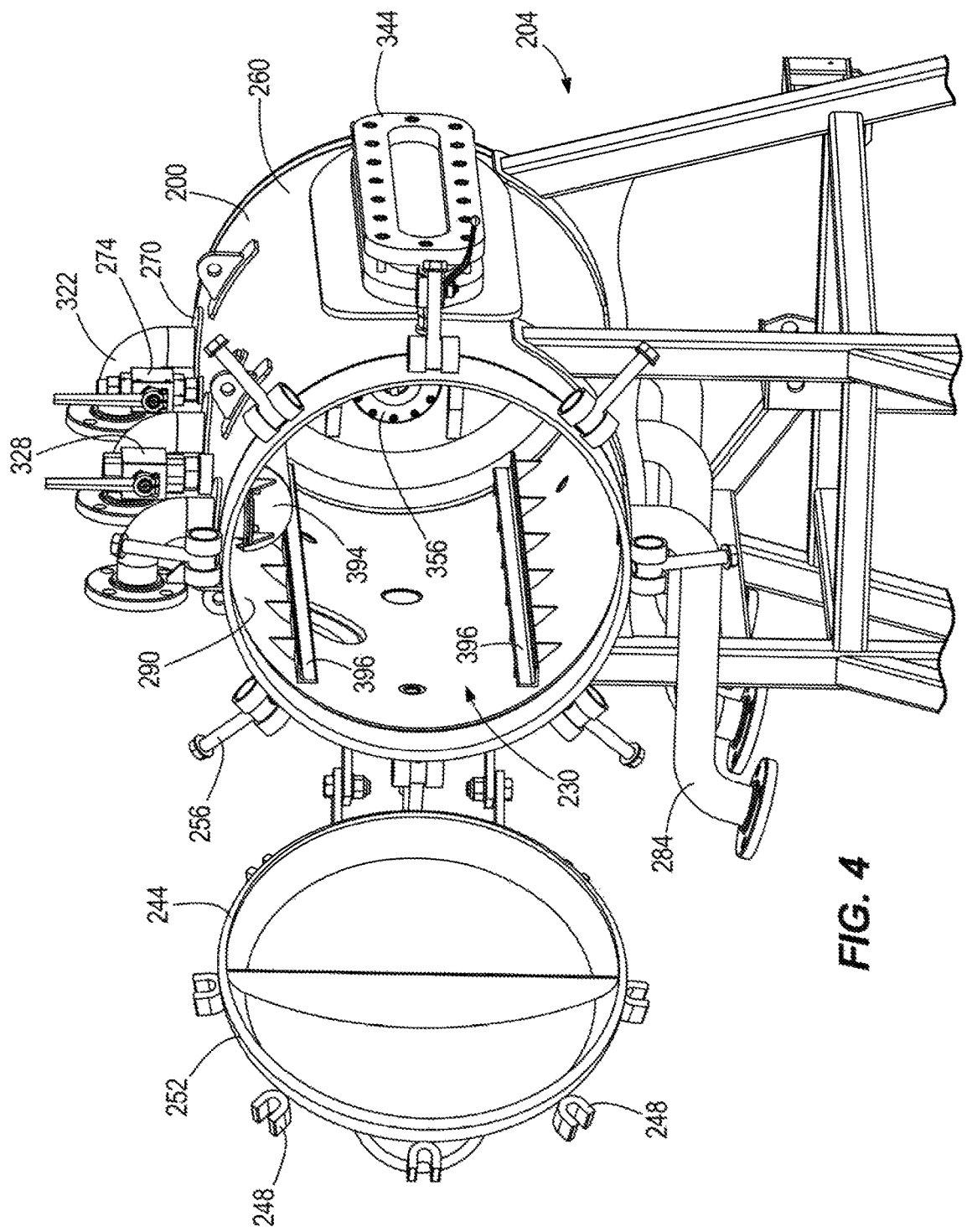
FIG. 4 is a perspective view of a vessel of the cross flow membrane subsystem.
Figure 5:
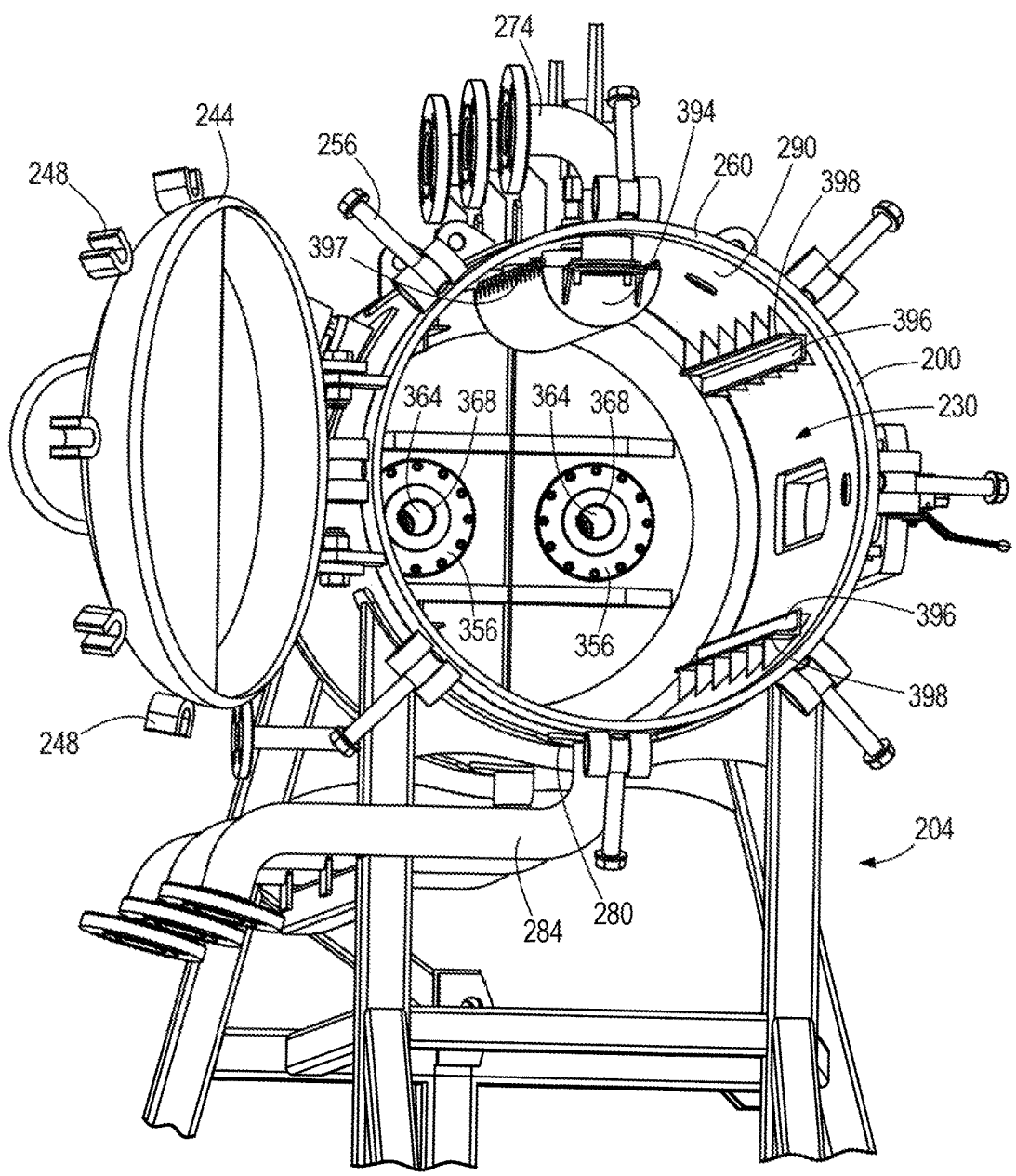
FIG. 5 is another perspective view of the vessel of FIG. 4.

Referring also to FIGS. 4 and 5, the pressure vessel 200 provides a sealed containment chamber, region or volume 230 rated for operation of the membrane subsystem 100 at positive gauge pressures and includes an end closure 240 and a hinged closure or door 244 having a plurality of door brackets 248 about a circumferential edge 252 configured to engage an opposing plurality of pivot bolts 256 pivotally attached to the vessel body 260.

The orientation of the vessel 200 can be approximately horizontal, approximately vertical (with respect to a ground surface), or at an inclined angle for maintainability and to account for space available in a particular installation.

The pressure vessel 200 includes a feed port 270 for connecting an inlet or feed conduit 274 and a discharge port 280 for connecting an outlet or concentrate conduit 284. The ports 270, 280 can be of any type known for use with such vessels, e.g., in the form of straight or elbowed flange connections and with or without additional piping to extend the port connections away from the vessel body 260.

In some embodiments, a single feed port 270 leads to a distribution header (not shown) extending within the vessel 200 along a portion of the interior surface 290 and having a plurality of outlets. In the illustrated embodiment, a plurality of separate feed ports 270 spaced along the length of the vessel 200 (from a first end to a second end, i.e., from the end closure 240 to the door 244 or vice versa) is instead utilized. The feed ports 270 are each connected to an inlet control valve 294, and each inlet valve 294 is in fluid communication with an inlet manifold 298 and a feed line air relief valve 302 with an additional conduit connection, such as a "quick" conduit connection 310. The other side of the illustrated manifold 298 ends in a subsystem inlet port 314. An air vent 324 at the apex of the vessel curvature (depending on orientation) includes a manual or automatic valve 328 communicating the interior of the vessel 200 with the external atmosphere.

One or more of the feed ports 270 may also serve as a clean-in-place (CIP) port for a CIP connection. For example, the entirety of the previously described inlet manifold 298 and inlet ports 270 may double as a CIP connection. Alternatively, in an embodiment without the illustrated inlet manifold 298, one or more of the separate feed ports 270 could instead be an individual CIP port, e.g., the centrally located feed port 270, while the lateral feed ports 270 are reserved for inlet feed liquid. A compressed air connection 320 with an inlet air valve 322 is provided along with the CIP connection, the purpose of which will be detailed below.

In some embodiments, a single discharge port 280 leads from the vessel 200. In the illustrated embodiment, a plurality of separate discharge ports 280 spaced along the length of the vessel 200 and supported by the support frame 204 are each connected via a concentrate outlet 284 to an outlet control valve 330, each of which is in fluid communication with an outlet manifold 334 and an outlet port 338 of the subsystem 100.

A plurality of monitoring ports, such as observation ports 340, 344, are positioned along an outside surface of the vessel body 260. Additional auxiliary ports may be present, to include vertically spaced ports for the use of a visual level indicator or a level transmitter 350, and optionally a pressure transmitter 354.

Figure 14:
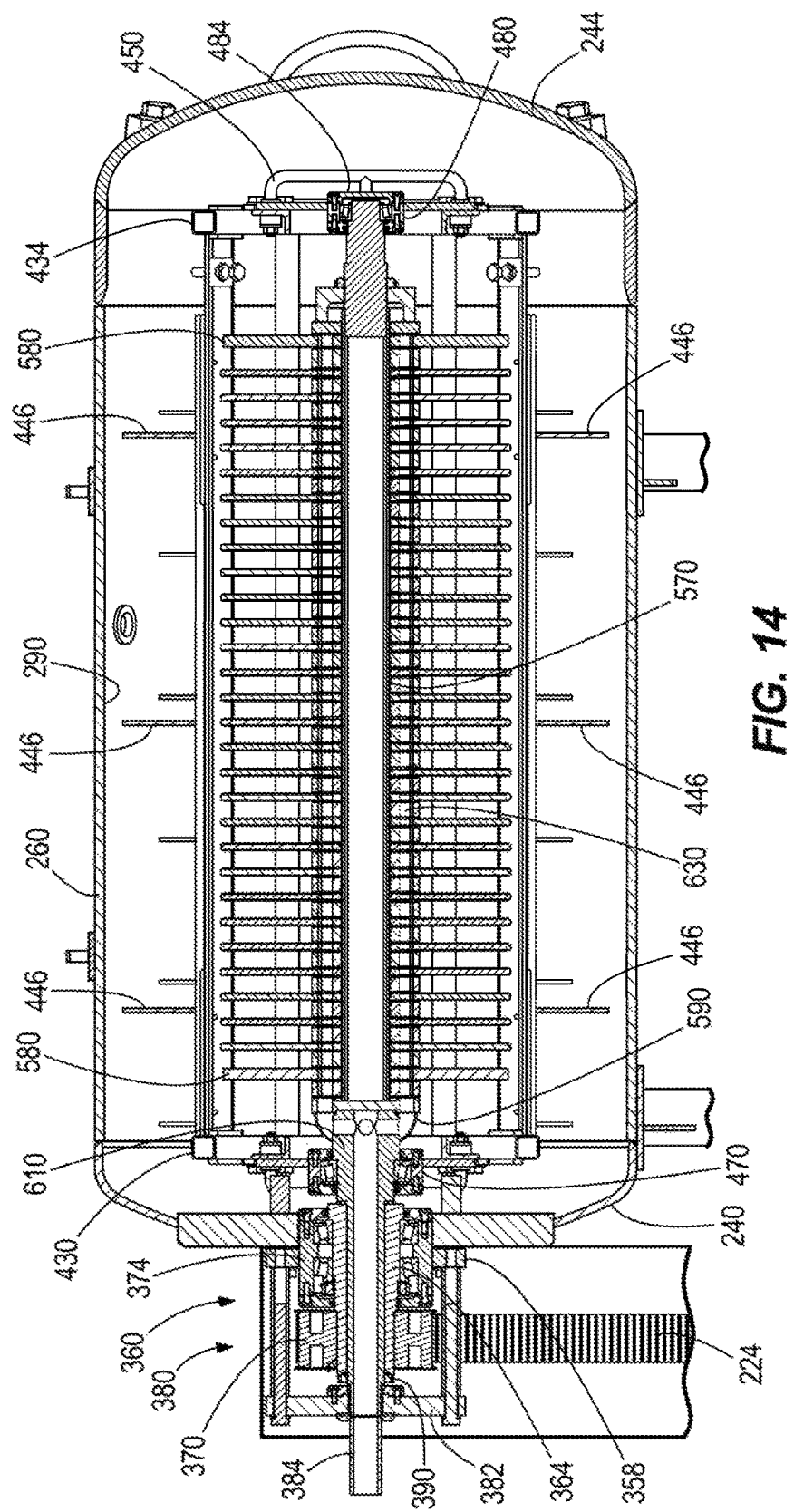
FIG. 14 is a cross sectional view taken along line 14-14 of FIG. 3.

The end closure 240 of the vessel 200 includes internal flanges 356 (FIG. 5) and external flanges 358. Referring also to FIG. 14, a drive subassembly 360 comprises a drive support shaft 364 at least partially defining openings 368 within the vessel interior concentric with the flanges 356. The drive subassembly 360 is cooperative with the drive belt 224 through a drive sheave 370 and further includes a bearing and seal mount (e.g., lip seals) 374 (FIG. 14) penetrating the end closure 240 when assembled.

A permeate subassembly 380 including a flange 382 and a permeate conduit section 384 with a permeate discharge valve 386 (a ball valve, butterfly valve, etc.) ends in a permeate port 388. The permeate subassembly 380 covers a locking nut 390 at the end of the support shaft 364 and is connectable to the external flange 358, as will be further described below.

Any of the inlet, outlet, or permeate ports 314, 338, 388 may be in communication with additional pressure and/or flow transmitters for monitoring and system adjustment.

In the interior of the vessel. 200, an open manifold or trough 394 may be secured to the inner wall 290 of the vessel 200 to evenly distribute the feed stream from one or more of the feed ports and/or the CIP ports 270. Specifically, the trough 394 can extend longitudinally adjacent the entirety of the feed port(s) and the CIP port(s) 270. Alternatively, the trough 394 is positioned adjacent to only some of the feed port(s) and the CIP port(s) 270. Regardless of positioning, the trough 394 comprises a containment volume, arcuately or otherwise formed, with shaped edges 397, e.g., a sawtooth shape, along all or a portion of the length of the trough 394.

The interior of the vessel body 260 further presents a plurality of inner mount rails 396 fixedly attached to the interior surface 290 and positioned to receive a membrane cartridge assembly 400. In the illustrated embodiment, four inner mount rails 396 are located approximately 90 degrees apart and welded or otherwise permanently affixed to the circular interior 290. Each rail 396 comprises a 90 degree bend and may be, fir example, a section of angle iron with spaced support plates 398 for welding. In other embodiments one, two, three, or five or more mount rails 396 may be attached and positioned around the interior 290.

The openings 368 are cooperatively aligned with the inner mount rails 396 for insertion of the membrane cartridge assembly 400, as further described below.

Figure 6:
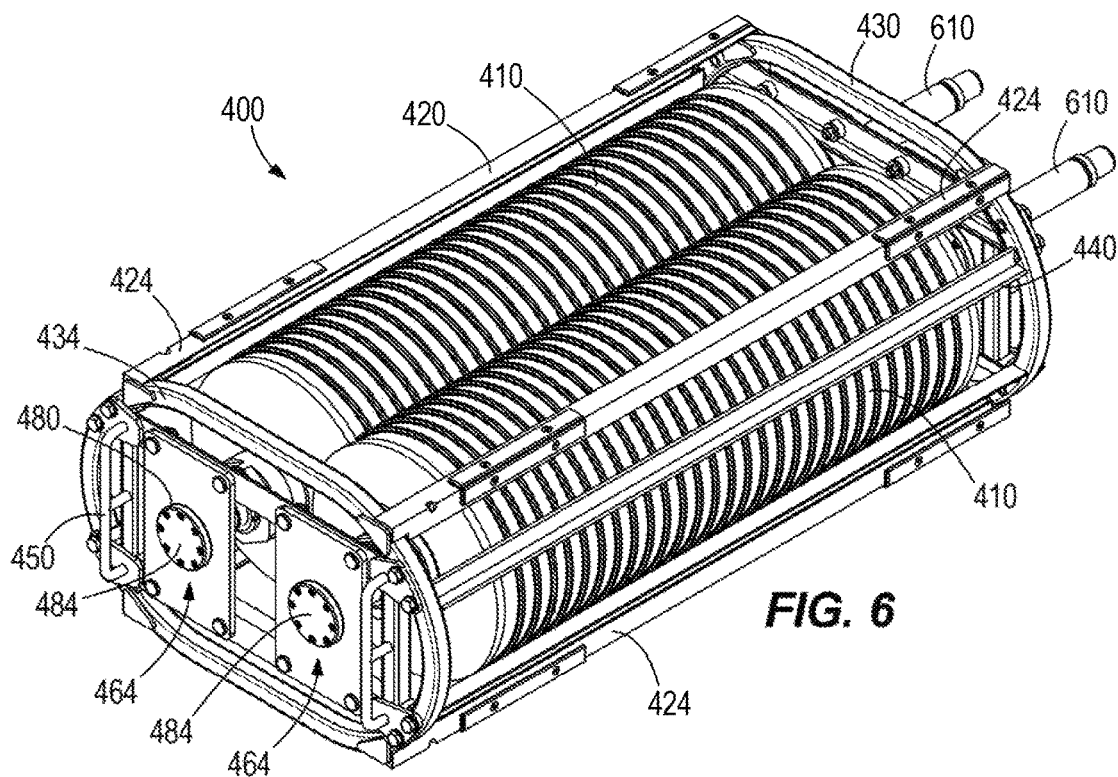
FIG. 6 is a perspective view of a membrane cartridge subassembly.
Figure 15:
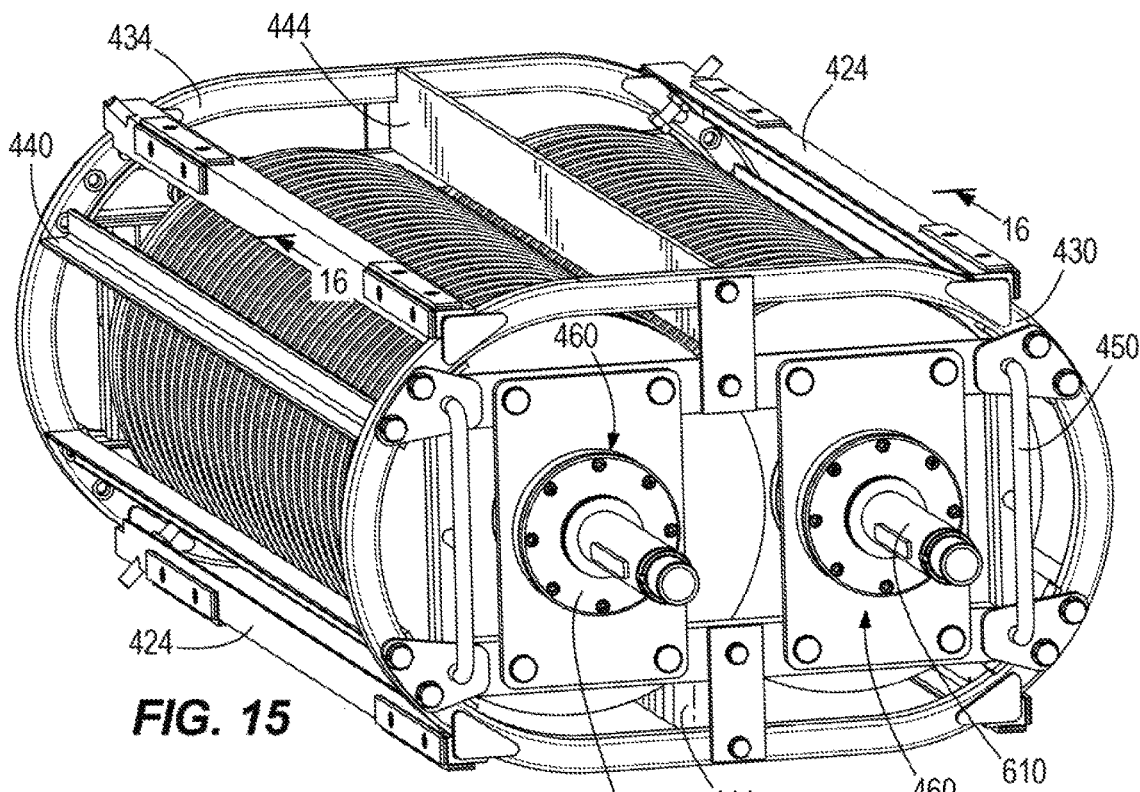
FIG. 15 is a perspective view of another membrane cartridge assembly.
Figure 16:
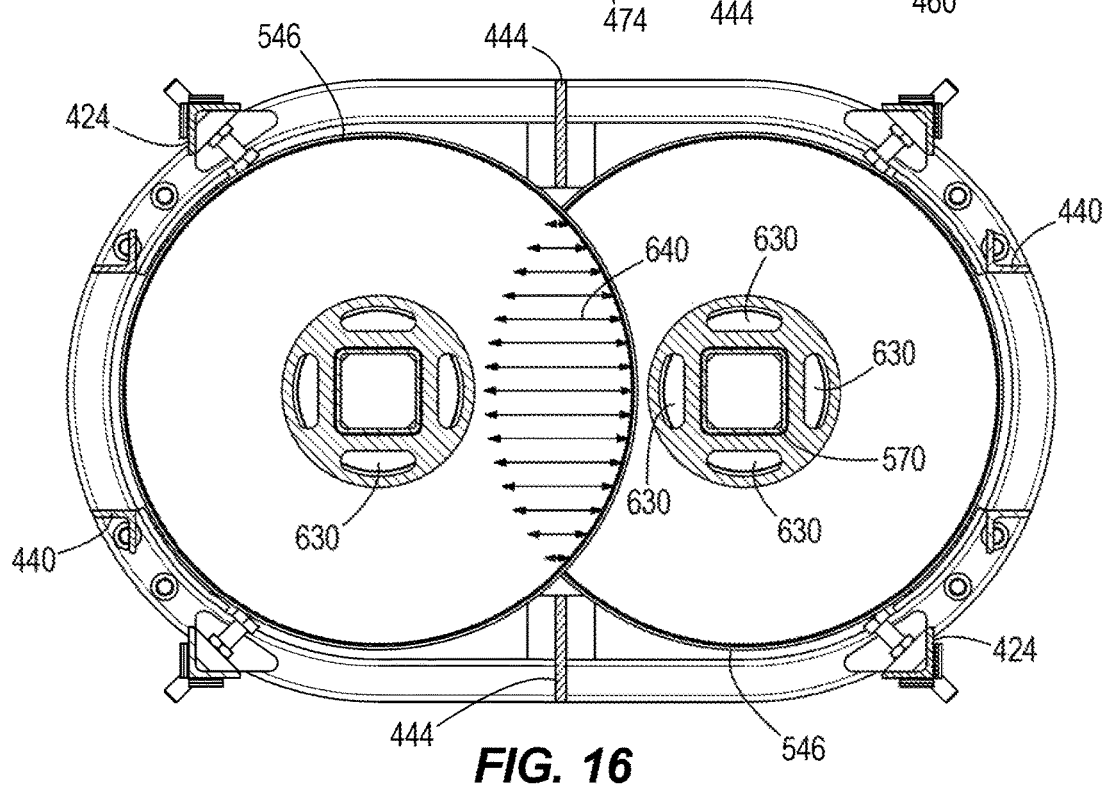
FIG. 16 is a cross sectional view taken along line 16-16 of FIG. 15.

Referring to FIG. 6, the membrane cartridge assembly 400 includes a plurality of membrane subassemblies or stacks 410 situated within a frame 420 constructed of a plurality of insert rails 424. The insert rails 424 are formed for positional engagement with the inner mount rails 396. The insert rails 424 extend between opposing end frame members 430, 434, and additional supports 440 may also provide structural stability to the frame 420. In the alternative embodiment of FIG. 15, a centrally located plate or baffle 444 also extends between the end frame members 430, 440 and at least partially into the space formed between the membrane stacks 410, as shown in FIG. 16. The baffle 444 may be positioned at one or both sides between the membrane stacks 410, i.e., two baffles 444 are shown in FIG. 16. In yet other embodiments, one or more baffles 444 are instead affixed to the vessel body 260, and more particularly protrude radially inward from the interior surface 290 of the vessel 200 within the chamber 230 such that the baffle(s) 444 extend at least partially into the space formed between two membrane stacks 410 when positioned within the vessel 200. In some embodiments, the aforementioned manifold or trough 394 may be mounted or otherwise secured to the membrane cartridge assembly 400, e.g., on top of the assembly 400.

One or more radial baffles 446 can be removably or fixedly mounted above and/or below the cartridge assembly 400 and to the cartridge frame 420. The baffles 446 are positioned to at least partially block the open space at the top and/or bottom of the cartridge assembly 400 between the outer periphery of the discs and the interior surface 290 of the vessel 200 (further detailed below). The baffles 446 can be equally or unequally spaced along the length of the frame 420. In some embodiments the baffles 446 can be axially offset from one another, or skewed to one side or the other in relation to the top and/or bottom of the cartridge assembly 400, respectively. In yet other embodiments, one or a plurality of baffles can be used, either or all of them placed at any point along the frame or within the vessel 200. In some applications, the number and location of the baffles 446 is dependent on the length to diameter ratio of the stack 410 length to the diameter of the discs 500.

The frame 420 includes maneuvering handles 450 and connection assemblies 460, 464 at each end frame member. A first of the connection assemblies 460 presents support bearings 470 concentric with flanges 474. The second connection assembly 464 on the other side of the frame 420 includes support bearings 480 concentric with two capped flanges 484. In the illustrated embodiment hereinafter described, the number of membrane stacks 410 within the membrane cartridge assembly 400 is two, though one or three or more membrane stacks 410 with a properly configured frame 420 can be used with a vessel 200 adapted to receive three or more membrane stacks 410.

In some embodiments, a wheel cartridge cradle (not shown) is configured to support and transport the membrane cartridge assembly 400 and may include receiving rails to support two or more of the insert rails 424 of the frame 420, though other means of transporting one or more membrane assemblies 400 to the pressure vessel 200 are contemplated.

Figure 8:
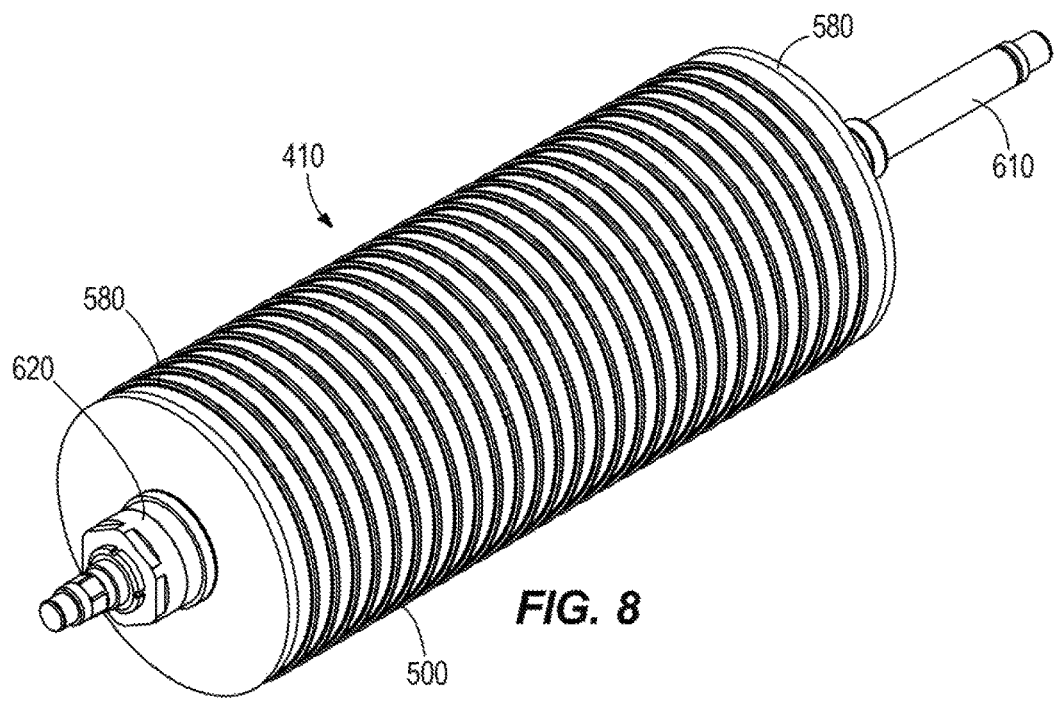
FIG. 8 is a perspective view of a membrane stack of the membrane cartridge subassembly of FIG. 6.
Figure 9:
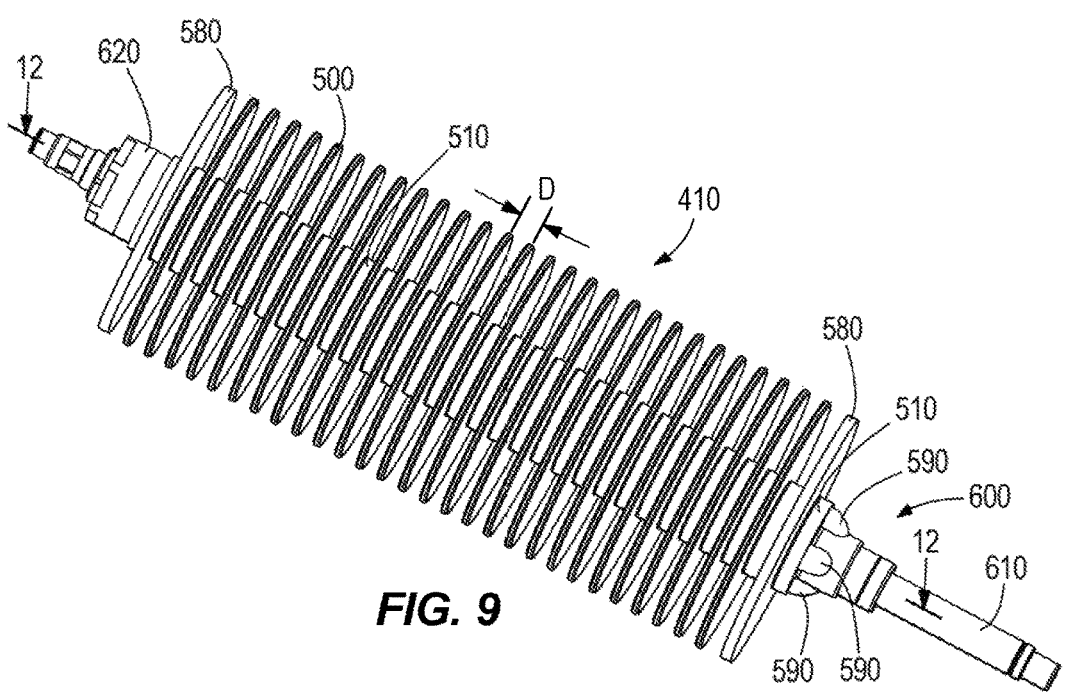
FIG. 9 is a side perspective view of the membrane stack of FIG. 8.
Figure 10:
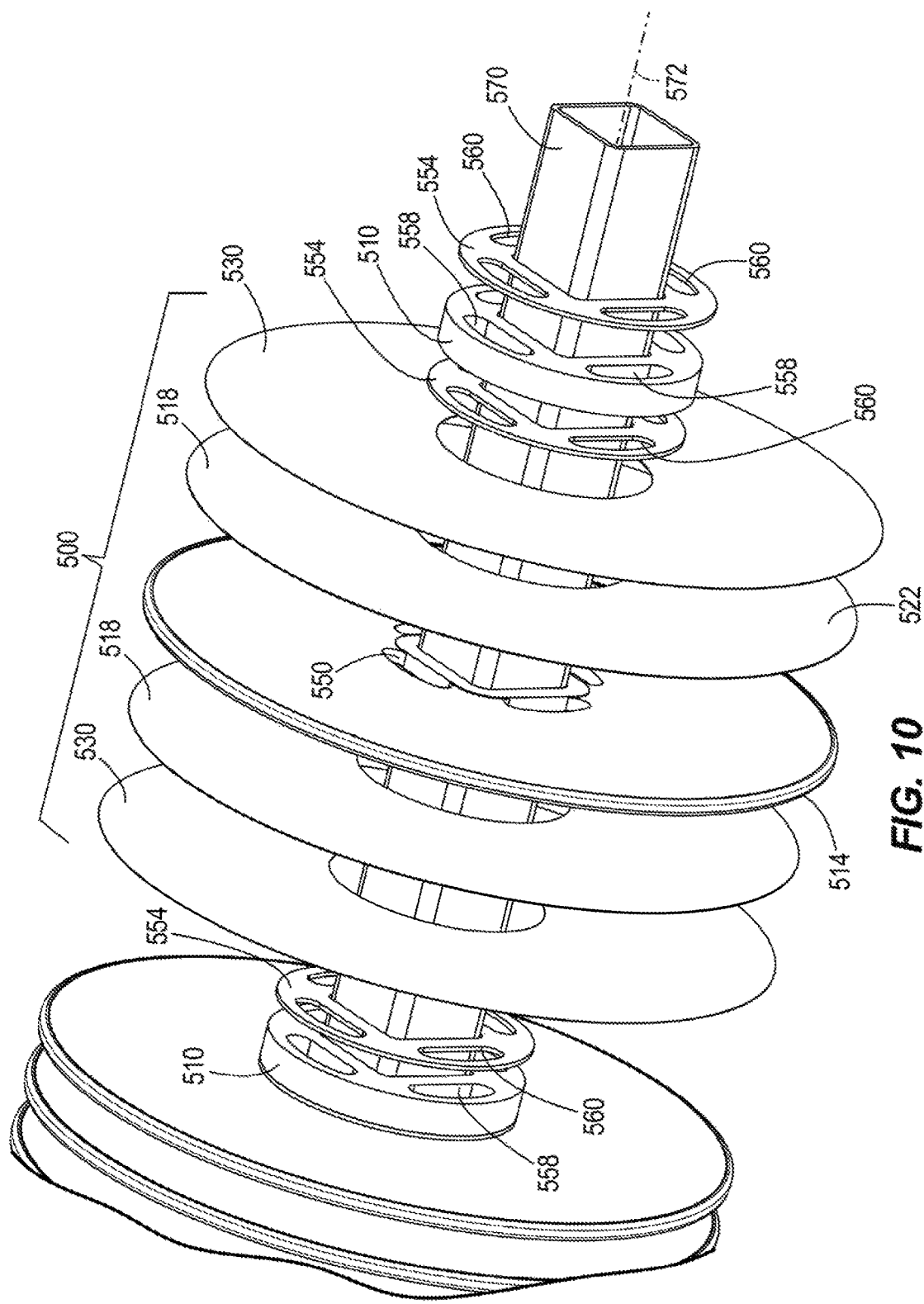
FIG. 10 is an exploded view of a portion of the membrane stack of FIG. 8.

Each membrane stack 410 comprises a series of axially spaced membrane covered discs ("membrane discs") 500 with hubs 510 therebetween, as shown in FIGS. 8 and 9. Referring also to FIG. 10, each disc body 514 is sandwiched by opposing permeate carriers 518. The opposite outwardly facing side 522 of each permeate carrier 518 abuts a filtration membrane 530. The membranes 530 may be reverse osmosis (RO), nanofiltration (NF), ultrafiltration (UF), or microfiltration (MF) membranes.

Figure 11:
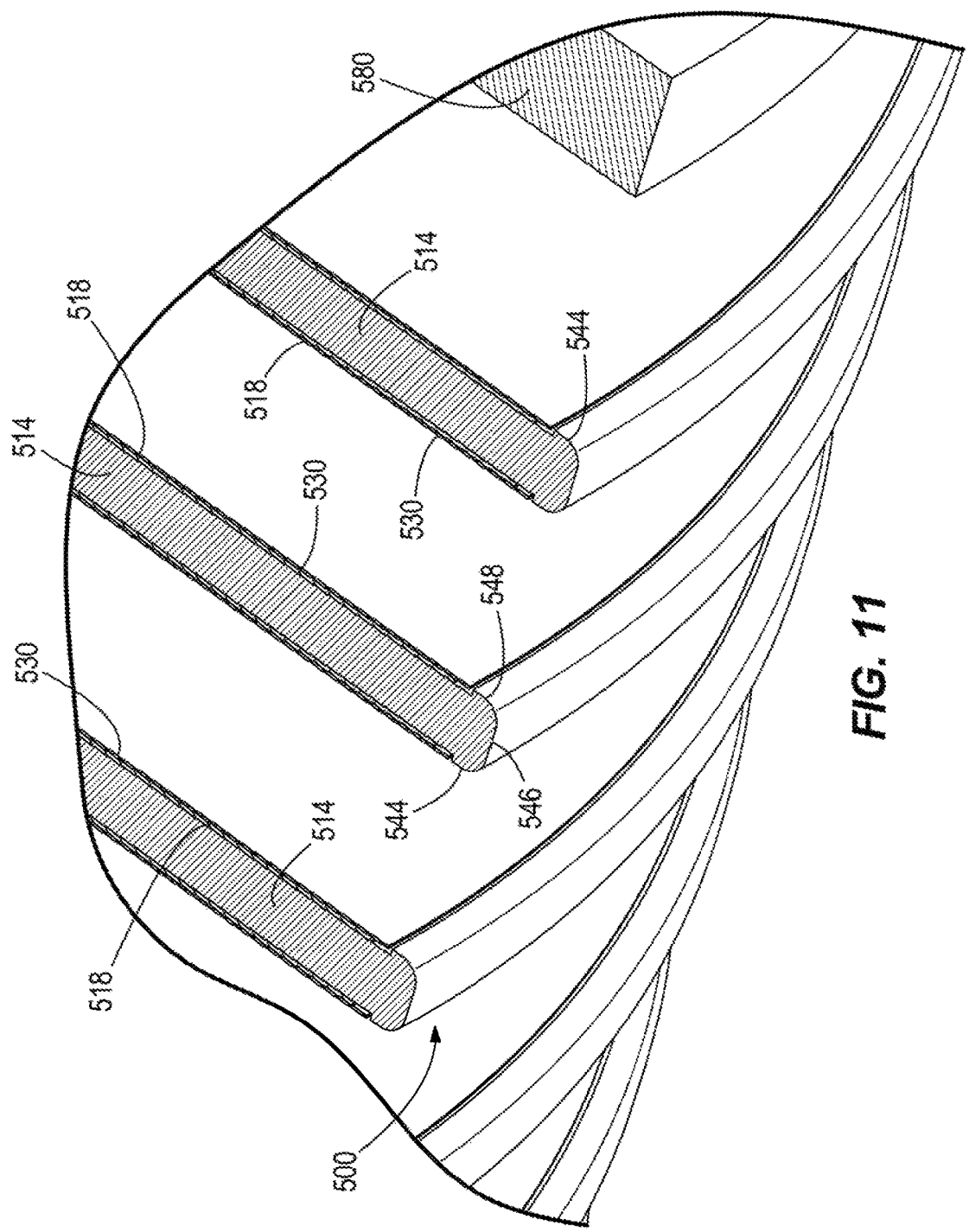
FIG. 11 is a detail view of a portion of the membrane stack of FIG. 8 illustrating the arrangement of discs, permeate carriers, and membranes.
Figure 12:
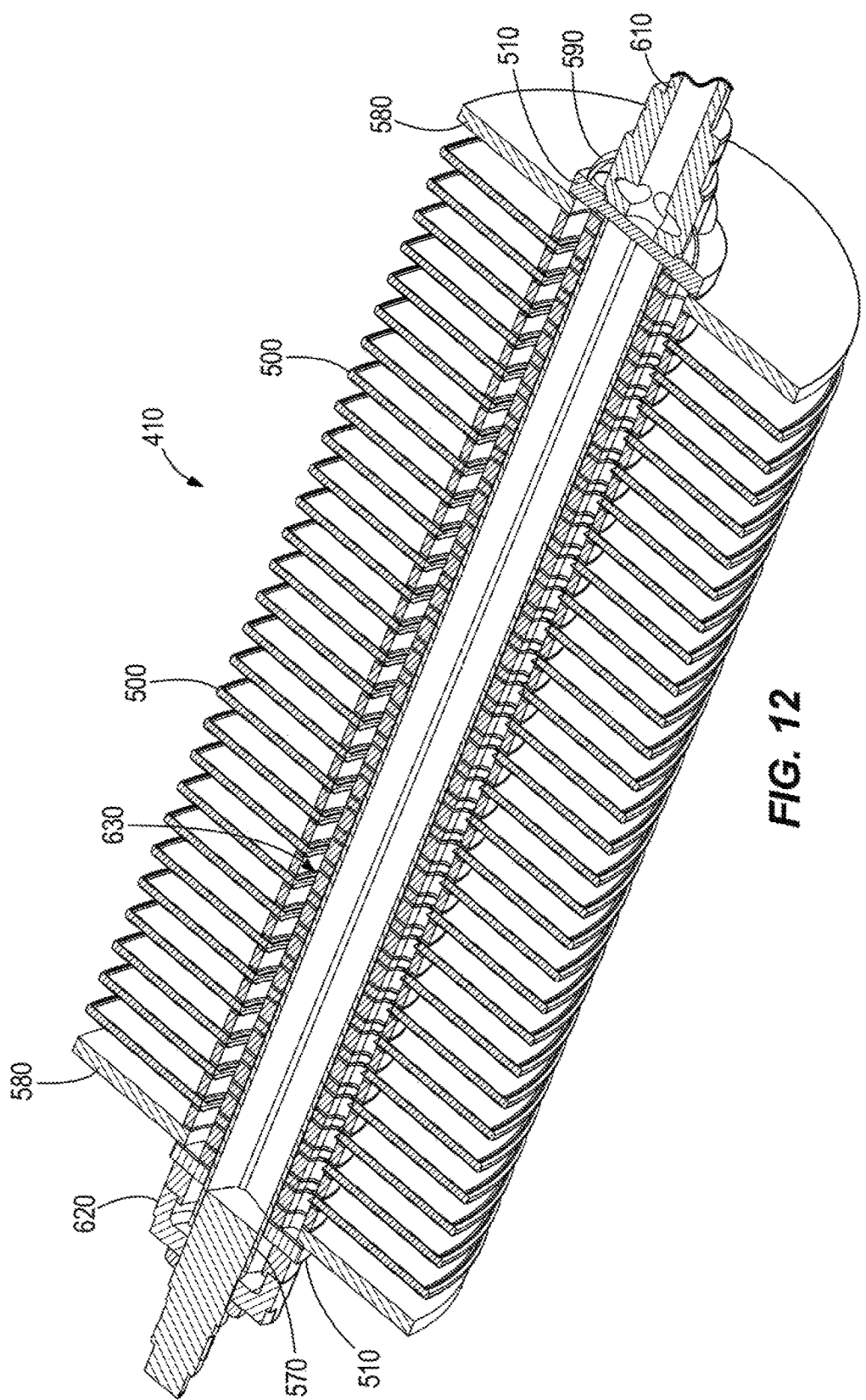
FIG. 12 is a partial cutaway view of a portion of the membrane stack of FIG. 8.
Figure 13:
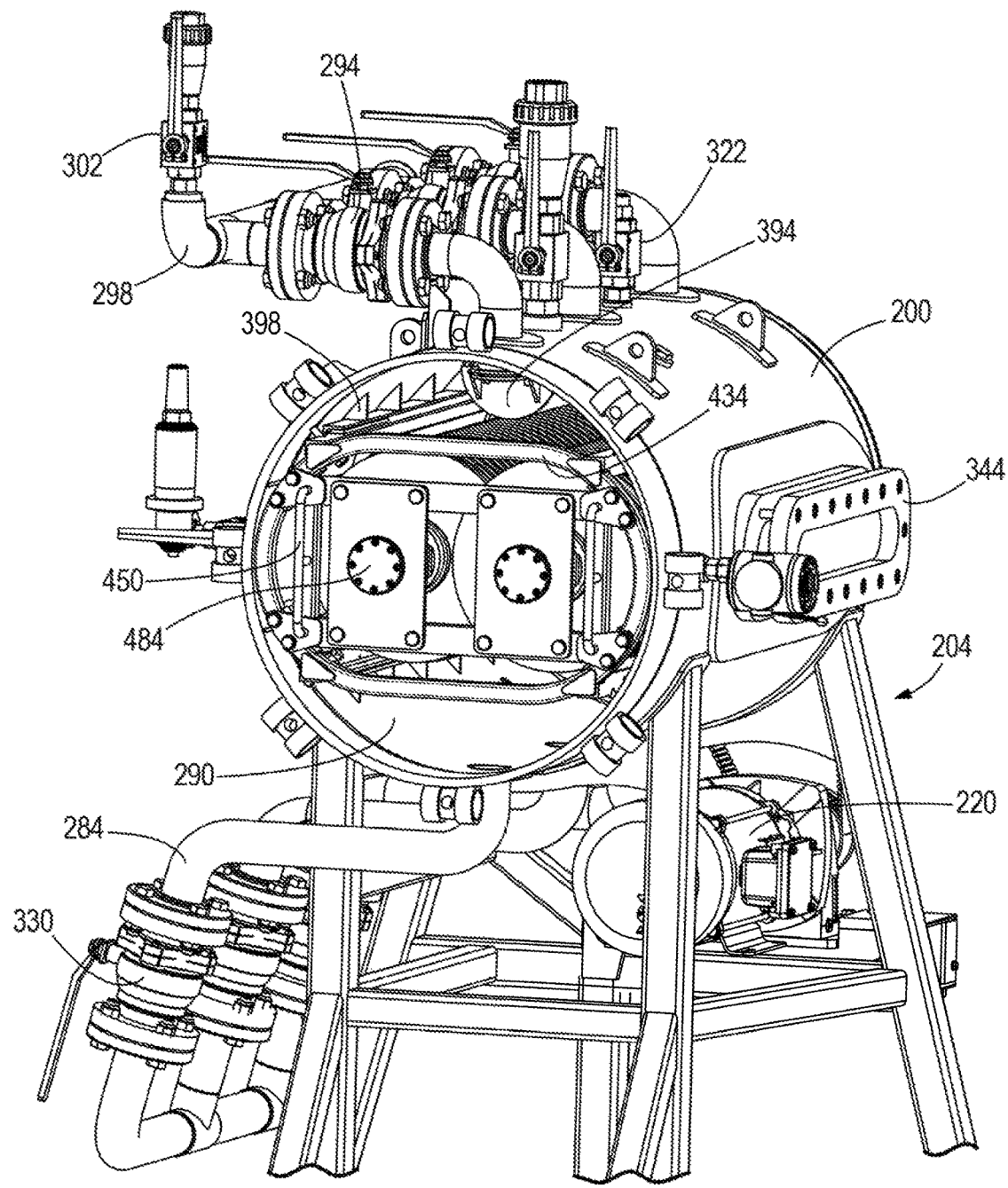
FIG. 13 is a perspective view of a cross flow membrane subsystem with a membrane cartridge assembly inserted within the vessel.

Referring also to FIG. 11, each disc body 514 is constructed of a rigid, generally non-porous plastic, ceramic, metal, biologically based (e.g., bio-tissue) or the like material, that extends radially and ends in opposing peripheral lips 544 and a peripheral edge 546, with the permeate carrier 518 and membrane 530 positioned such that the membrane 530 is approximately flush with an outer surface 548 of the peripheral lip 544. In other constructions, an end cap (not shown) can be secured to the periphery of the disc 514 to form a recess in which the permeate carrier 518 and membrane 514 are positioned flush. In another embodiment, an end cap can be formed over the outer edge of the disc 514 to encapsulate the membrane 530 and carrier 518. In yet other embodiments, a permeate carrier is not present and the disc body 514 is porous or semi-porous in construction and in direct contact with the surface of the membrane 530. Alternatively, the above discs 514 may be constructed of a sintered metal, metal plate, ceramic, or optionally of a biologically-based material. Each disc includes a plurality of permeate collection apertures 550.

Referring to FIG. 10, between each disc/membrane set 500, as noted, is a hub 510, with a gasket 554 separating each hub 510 from the surface of the adjacent membrane 530. The hubs 510 and gaskets 554 are formed with respective apertures 558, 560 positioned to accommodate the flow of permeate, as will be further described below, with the gaskets 554 sealing the apertures 558, 560 to contain the flow of permeate within. The discs 514, permeate carriers 518, membranes 530, hubs 510, and gaskets 554 are all coaxially aligned about a central shaft 570 having a longitudinal axis 572 and thereby form a disc spacing, i.e., an axial center-to-center disc distance D (FIG. 9) that can range from 0.125 inches or less to 2.0 inches or greater, with a preferable spacing of 0.25 inches. The discs 514 may vary in radial size to optimize available surface area in a particular system and a disc diameter may range from approximately 4 inches or less up to 6 feet or greater in some industrial applications. In addition, the hub assembly dimensions may be altered for a different spacing D between discs 514. Further, each end of the membrane stack 410 may include a plate or flywheel 580 of sufficient comparative distributed weight. In some applications such a plate 580 could be positioned within the membrane stack 410 itself in addition to or in lieu of the end position(s) illustrated.

The discs 514, hubs 510, and gaskets 554 are assembled onto the shaft 570 layer by layer. At the permeate discharge end (the end corresponding to the first connection assembly 460 of the frame 420) a plurality of conduits 590, each associated with a respective alignment of apertures 550, 558, 560, each form a bend that connects an end hub 510 to a permeate collection assembly 600 comprising a permeate tube 610 stepped or otherwise configured for mating with the drive support shaft 364 and the support bearings 470. At the blocked end (the end corresponding to the second connection assembly 464 of the frame 420) a threaded fixture 620 is utilized to compress the membrane discs 500 with the gaskets 554 and hubs 510 to form a plurality of lengthwise permeate channels 630 defined by and coincident with the apertures 550, 558, 560, and with the disc spacing D, that will be fluid tight with respect to the remainder of the vessel 200 contents during operation. The entire membrane stack 410 is retained by the compression exerted by the threaded fixture 620.

Figure 7:
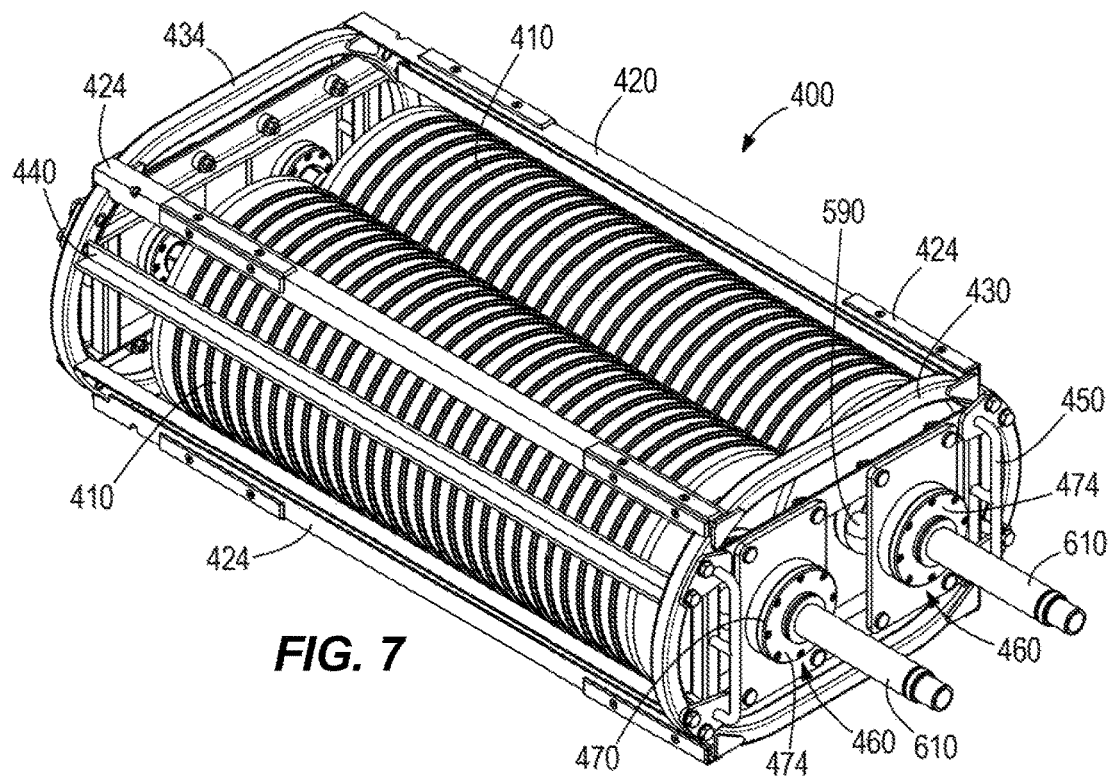
FIG. 7 is another perspective view of the membrane cartridge assembly of FIG. 6.

Each membrane stack 410 is subsequently mounted onto the frame 420 and rotatably coupled to the supporting bearings 470. Specifically, as shown in FIGS. 6, 7, and 16, the membrane stacks 410 are positioned within the frame 420 such that the discs 500 overlap, forming an overlap region 640, with the discs 500 of one membrane stack 410 alternately interspersed within the disc spacing D of the other membrane stack 410, and vice versa. The radial distance of the overlap region 640 may vary, and the clearance between adjacent discs in some applications is approximately 0.25 inches from surface to surface. In other embodiments, the discs 500 of one membrane stack 410 do not overlap at all with the discs 500 of the other membrane stack 410. The second connection assemblies 464 are then capped. For ease of assembly, the baffles 444 may alternatively be removably coupled to the frame 420 such that one or both are affixed to the frame 420 after the membrane stacks 410 are disposed within the frame 420. The assembled membrane cartridge assembly 400 may then be arranged on a cartridge cradle for transport.

To assemble a completed high velocity cross flow membrane subsystem 100, a membrane cartridge assembly 400 must first be inserted into the vessel 200. To insert a membrane cartridge assembly 400 into the vessel, the operator transports the cartridge assembly 400 to the vessel 200 and aligns the insert rails 424 (four in the presently described embodiment) of the frame 420 with the mounting rails 396 along the interior surface 290 of the vessel body 260. The operator then pushes the cartridge assembly 400 into the vessel 200 along the length of the mounting rails 396, which will automatically align the permeate tubes 610 with the openings 368. The permeate tubes 610 will pass through the end closure 240 of the vessel 200, including the respective drive support shaft 364, associated bearing and seal mount 374, and the drive sheave 370. The locking nut 390 for each permeate tube 610 is then tightened, which secures the permeate tube to the drive support shaft 364. The flange 382, which includes conduit section 384 and the valve 386, is secured to the respective external flange 358. Other configurations of sealing and locking components for the drive subassembly 360, such as drive bearing and a non-drive bearing lip seals, or other shaft seals, can be operationally positioned between the permeate tubes 610 and the end closure 240 or optionally configured with the permeate subassembly 380. In all embodiments, the membrane subassembly 400 is secured within the vessel 200 from outside of the vessel 200.

The internal rails 396 support the membrane cartridge assembly 400 when inserted. In some embodiments, the aforementioned baffles 446 instead comprise baffle inserts that can be positioned within the vessel 200 after insertion of the cartridge assembly 400. In yet other embodiments, one or more baffles can be removably or fixedly secured to the interior surface 290 prior to insertion of the cartridge assembly 400.

Thereafter, the operator closes the hinged door 244 to create a watertight enclosure. With the membrane cartridge assembly 400 in place and the permeate tube 610 in communication with the permeate subassembly 380, the membrane system 100 can be operated.

Figure 17:
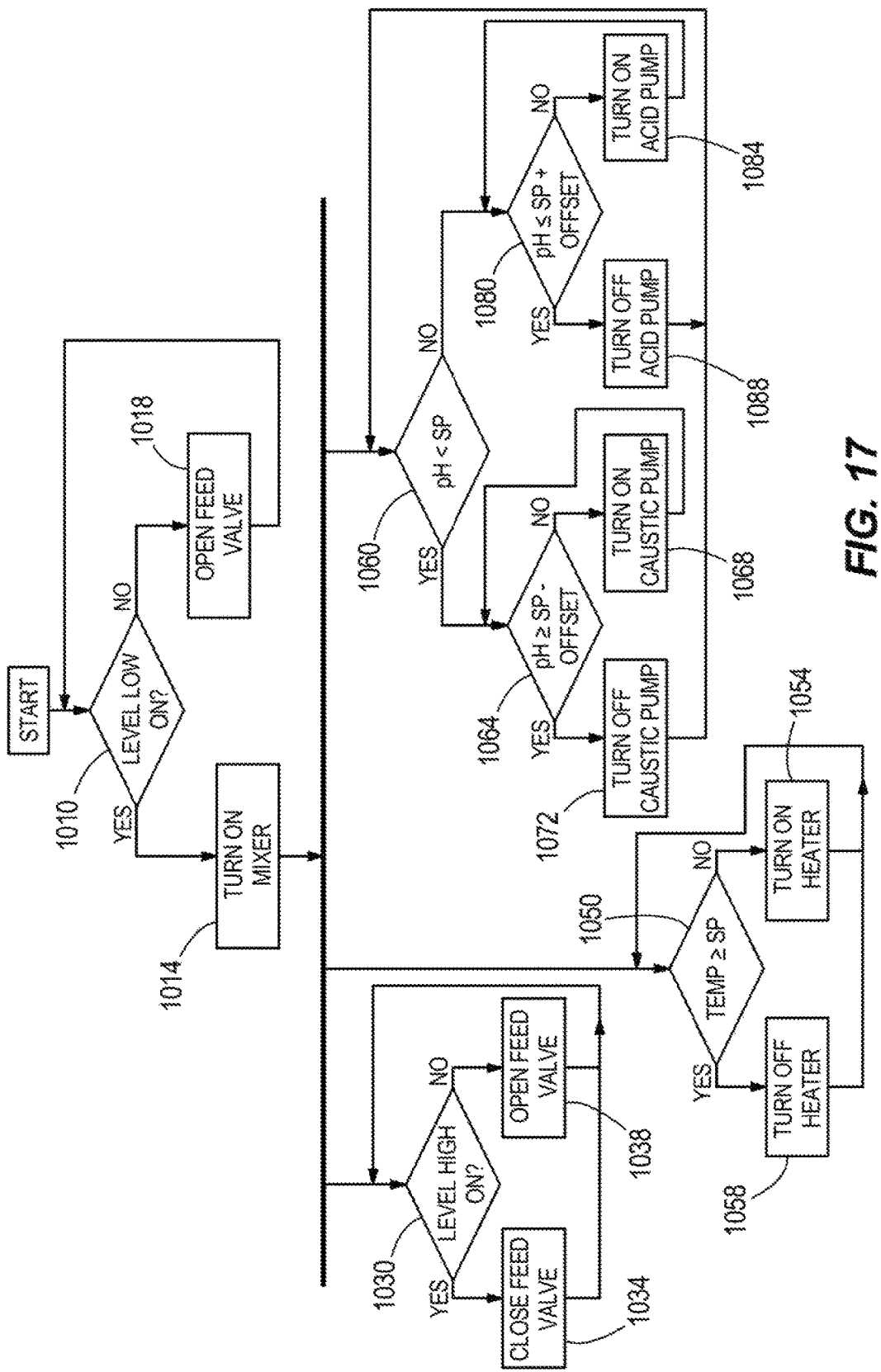
FIG. 17 is a schematic view of an operational feed tank sequence of the treatment system of FIG. 1.

In operation, the level of the feed tank 124 is first established and monitored through the level sensor 150. Referring to FIGS. 1 and 17, if a level sensor "low" condition (step 1010) is not yet sensed, the feed valve 122 is opened to permit a feed flow into the tank 124. If at least the "low" condition is sensed the mixer 156 within the tank 124 is started (step 1014). Once the mixer 154 is activated, if a level sensor "high" condition (step 1030) is determined, the feed valve 122 is closed (step 1034), otherwise the feed valve 122 remains open (step 1038). Concurrently, the temperature sensor 152 monitors the temperature of the contents of the tank 124 (step 1050) and either turns on (step 1054) or off (step 1058) the heater 158 to adjust the feed temperature with respect to a temperature setpoint.

The feed pH is also adjusted within the tank 124. With the mixer 156 on, the pH sensor 154 determines the pH of the feed relative to a pH setpoint (step 1060). If the sensed pH is less than the pH setpoint but not greater than the pH setpoint minus an offset factor or value (step 1064), then the caustic chemical pump 131A is activated (step 1068). If the sensed pH is greater than the pH setpoint minus an offset factor, then the caustic pump 131A is deactivated (step 1072). Likewise, if the sensed pH is greater than the pH setpoint but not less than the pH setpoint plus the offset factor (step 1080), then the acid chemical pump 131B is activated (step 1084). If it is less than the pH setpoint plus the offset factor, then the acid pump 131B is deactivated (step 1088).

Figure 18:
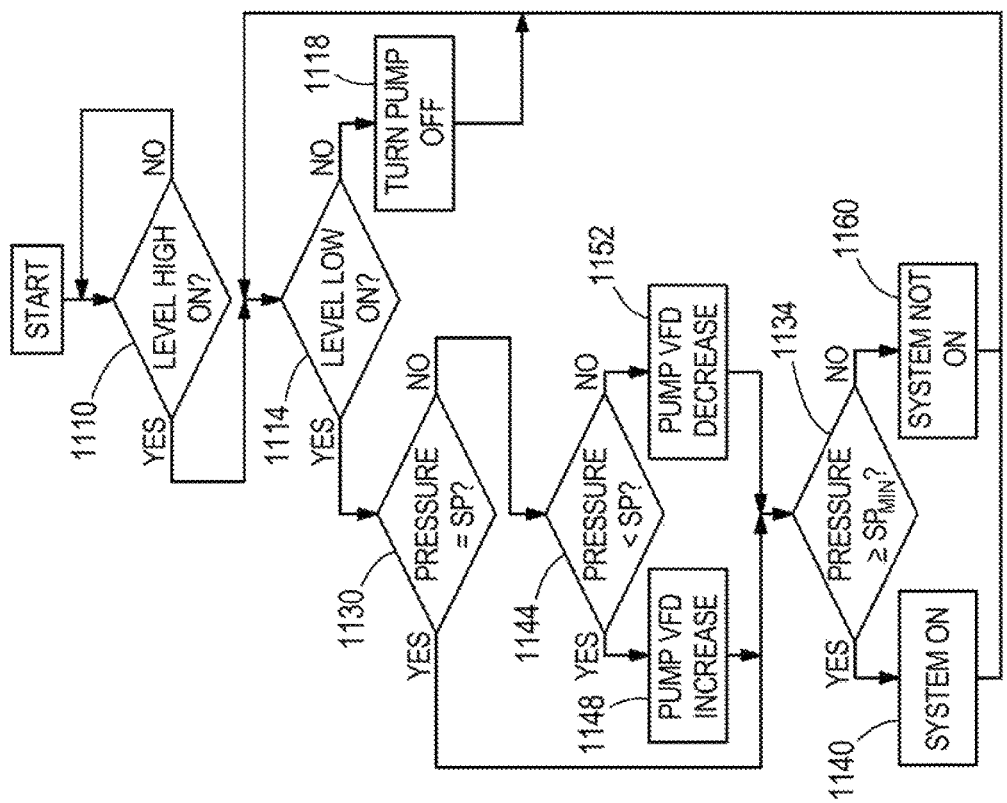
FIG. 18 is a schematic view of an operational pressurization sequence of the treatment system of FIG. 1.

Referring to FIG. 18, once the aforementioned feed parameters are established and the level sensor "high" condition is met (step 110) and the level sensor "low" condition is operational or true (step 1114), the feed pump 128 is activated (should the level sensor "low" condition be false, the feed pump 128 is deactivated (step 1118)).

In accordance with the program of the PLC, the liquid to be treated is fed through the inlet port 314, through the manifold 298 and open inlet control valves 294, and into the pressure vessel 200 via one or more feed ports 270 to distribute the liquid over some or all of the length of the installed membrane stacks 410 within the pressure vessel 200. In the presence of a trough 394, the feed will overflow the containment volume and disperse over the edges 397. During this inflow of liquid, air within the vessel 200 is purged through the air vent 324.

Use of certain feed and discharge ports 270, 280 may be application dependent. In some applications, for example, a feed port 270 nearer one of the end closure 240 and the hinged door 244 may be opened for feed inflow (with the other feed ports 270 closed), while an axially (i.e., lengthwise to the vessel 200 or normal to the vessel diameter) opposite discharge port 280 is opened for concentrate discharge (with the other discharge ports 280 closed) in order to promote a degree of axial flow of the medium to be treated within the vessel 200. Such a configuration may maximize the average flux rate in the aggregate across all membranes 530 of the membrane stacks 410. In other applications, the central feed port 270 (of three) is open for feed flow while all three discharge ports 280 are open. Any combination of feed and discharge ports 270, 280 may be opened or closed depending on the medium to be treated, the membrane 530 used, desired rotational speed of the discs 500, desired permeate flux or flow rate, or in view of other factors.

The pressure within the vessel 200 is monitored and if equal to a predetermined setpoint pressure (Step 1130) and greater than a minimum setpoint pressure (step 1134), a system "on" status is set (step 1140). The system is controlled to maintain the setpoint pressure: if the pressure within the vessel 200 is less than the setpoint pressure (step 1144), the pump 128 speed is increased (step 1148) via a VFD; if greater than the setpoint pressure, the pump 128 speed is decreased (step 1152) through the VFD. Should the vessel pressure drop below the minimum setpoint pressure, the system is no longer in the "on" status (step 1160).

Figure 19:
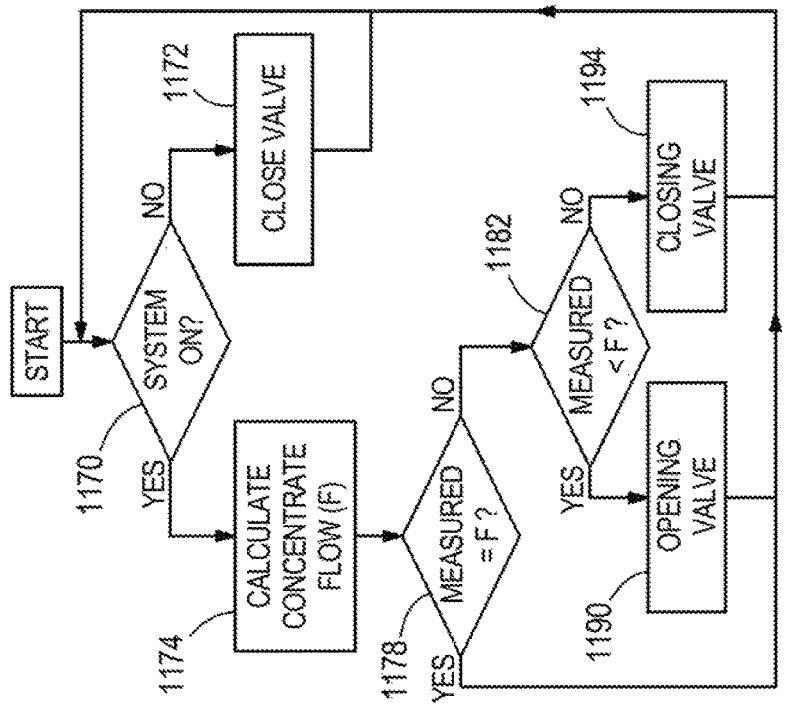
FIG. 19 is a schematic view of an operational flow adjustment sequence of the treatment system of FIG. 1.

With the system status (step 1170) "on," the drive 220 is concurrently started and the membrane stacks 410 rotate, through the belt drive 224, at a desired rotation rate. The stacks 410 and belt 224 are configured such that the belt 224 rotates each stack 410 in the same direction within the vessel 200. The plates 580 provide a ballast or "flywheel" effect to the rotating membrane stacks 410. Referring also to FIG. 19, the concentrate discharge is closed initially by the valve(s) 330 and/or a valve 700 (see FIG. 1) downstream of the manifold 334 unless the system status is "o-n" (step 1172). The flow of concentrate from the vessel is adjusted to maintain a predetermined VCF (volume concentration factor). Specifically, a desired concentrate flow rate is calculated at step 1174 based on the measured flow rate into the vessel 200 and the VCF. If the measured concentrate flow is equal to the desired flow rate (step 1178) then the concentrate flow rate from the vessel 200 is maintained. If not equal (step 1182) and the measured concentrate flow rate is less than the desired flow rate, the valve 700, in communication with the PLC, can be actuated to increase the concentrate flow (step 1190). If the measured concentrate flow rate is greater than the desired flow rate, the valve 700 can be actuated to decrease the concentrate flow (step 1194). The valve 700 can also be used to modulate the volume concentration factor of this flow. In some applications, the valve(s) 330 can control or modulate the concentrate flow from the vessel 200 in addition to or in lieu of the valve 700.

Once the vessel. 200 is filled with liquid and pressurized to a suitable operational pressure, the vessel pressure is maintained automatically through control of the concentrate discharge valve(s) 330 and/or the valve 700, as previously described, and/or through VFD control of the feed pump 128.

Upon rotation of the membrane stacks 410, a rotating or swirling flow of the contained liquid is generated around the inner surface 290 of the vessel 200, which may tend to stratify at least a portion of the fluid. This stratification hinders full mixing of the fluid in the space between adjacent discs 500. The baffle or baffles 444 interrupt(s) the swirling flow and divert or redirect more fluid into the overlapping disc space D to enhance mixing. The baffles 446 serve to minimize axial mixing or circulation of the fluid within the vessel 200 during operation.

As pressure in the pressure vessel 200 increases, the trans-membrane pressure across the membranes 530 (between the liquid on the exposed side of the membrane 530 and the permeate carrier side of the membrane 530) builds and drives liquid through the membrane 530 of each disc 500. The membrane separates particulate and dissolved matter, inorganic and organic, from the liquid passing through the membrane 530, depending on the particular properties of the membrane 530. The filtered liquid, in the form of permeate, enters the permeate carrier 518, and flows radially toward one of the permeate channels 630 formed by the apertures 550, 558, 560, where it collects. The permeate is at a pressure sufficient to permit its transport axially along the length of the central shaft 570 to the permeate subassembly 380. In those embodiments with a porous disc 514, permeate flows radially through the porous disc into an open hole in the disc and through one of the channels 630.

During this process, due to the rotation direction of each disc 500 of each membrane stack 410, within the overlapping disc space D the surface of one disc 500 approaches' the surface of the other immediately adjacent discs 500 of the other membrane stack 410. The liquid at the surface of the membrane 530 not passing through the membrane 530 contains retained solids, which are maintained in suspension by the high velocity induced by this relative disc rotation. The liquid not passing through the membrane 530 and containing these solids continues through the vessel 200 to the concentrate discharge port(s) 280 and passes through the vessel 200 and to the outlet port 338 as concentrate, where it may either be recycled for additional passes through the vessel 200 (through an additional conduit in communication with the feed water) or otherwise discharged, e.g., to drain or to the retentate system 132. The general adjustment of the concentrate flow was previously described. The concentrate is continuously collected from the vessel 200, and in some embodiments passes through an additional back pressure-flow rate controlling valve to maintain pressure within the interior of the pressure vessel 200 and/or maintain a predetermined solids concentration.

Figure 20:
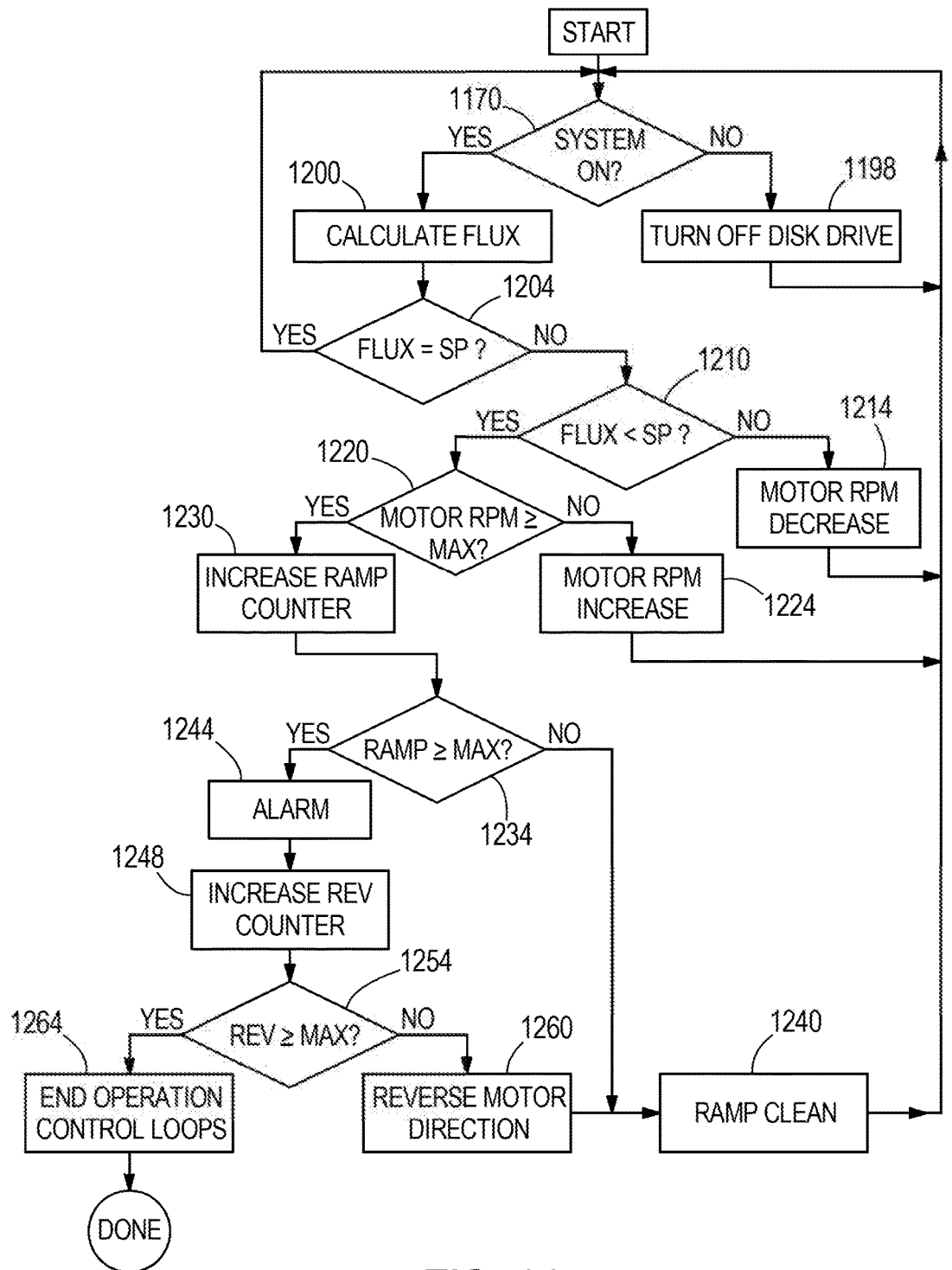
FIG. 20 is a schematic view of an operational drive sequence of the treatment system of FIG. 1.

Once at the desired operating pressure, the system 100 may operate continuously, subject to automatic control of permeate flow, vessel pressure, disc rotating speed, rotation direction, concentrate discharge rate, and feed supply rate. As an example, disc rotating speed may be set to achieve a desired rotations per minute (rpm) to achieve necessary cross flow velocity in conjunction with a sufficient permeate flow rate. The flux rate through the membranes 530 can also be identified in real time, by a transmitted permeate flow rate or by a difference between the flow rate through the inlet port 314 and the flow rate leaving the outlet port 338. The drive rpm can then be adjusted as necessary to obtain a desired permeate flow rate. Referring to FIG. 20, at the suitable pressure (else the drive 220 ceases rotating the membrane stacks 410, step 1198), a permeate flux rate is calculated based on the differential between the feed flow and the concentrate flow (step 1200). If the flux rate corresponds to a predetermined flux setpoint (step 1204), the system continues its current operation.

The rotational speed of the discs 500 is modulated to maintain a permeate flux rate. Specifically, if the flux rate is greater than the setpoint at step 1210, the VFD-operated drive 220 decreases (step 1214), decreasing the rotational speed of the membrane stacks 410. If the flux rate is less than the setpoint at step 1210, the rotational speed of the drive 220 is compared to a maximum rotational speed (step 1220); if not exceeding this maximum, the rotational speed of the drive 220 is increased (step 1224).

If the maximum rotational speed is exceeded, a motor control sequence is initiated. With this control sequence, a counter is increased (step 1230) and a "ramp-up" count compared to a ramp-up maximum (step 1234). If not greater than the ramp-up maximum, a ramp-up clean cycle is initiated (step 1240) in which the rotational speed of the discs 500 is significantly increased to increase the velocity across the membrane surface. Thus, if the permeate flux rate drops over time, the drive 220 rpm can be temporarily increased to increase the relative velocity between two membrane surfaces, thus producing an increased "self-cleaning" effect. As the permeate flux rate thereafter increases, the drive 220 rpm can be adjusted back down as necessary. If the ramp-up count is greater than the maximum, an alarm is activated (step 1244), a reverse counter is increased (step 1248), and the reverse counter compared to a reverse maximum (step 1254). If the reverse counter value is not greater than the reverse maximum, the direction of the drive 220 is reversed for a predetermined time (step 1260) prior to a ramp-up clean cycle (in the reverse direction). If it is greater than the reverse maximum, operation ceases and the system is shut down (step 1264) for cleaning.

In general, disc rotation can be intermittent or cycled periodically to reduce energy consumption during operation but still maintain sufficient membrane cross flow. In some embodiments, as described, the disc stacks 410 can be periodically reversed in rotation direction. Control of the concentrate flow rate through the concentrate control valve(s) 330 or the valve 700 as previously described occurs simultaneously witt the permeate flux rate calculation to permit the system 100 to concentrate solids in the concentrate to a desired level.

The membrane filter can thus be used to achieve separation of solids from liquids with reduced energy by rotating a membrane surface within a liquid as opposed to pumping the liquid at high velocity across the membrane surface. Higher cross flow velocities result in higher operating flux through the membrane 530 and reduced membrane plugging. The interspersion of the rotating discs 500 on parallel shafts 570 leads to even flow velocity and distribution over the membrane surface.

Periodically, and/or in response to a reduced permeate flow rate during operation at a given pressure, the system 100 is taken out of service for a short period for chemical cleaning (CIP or Clean-in-Place) of the membranes 530. This may be accomplished by feeding through the chemical system 120 a low pH (acidic) and/or high pH (caustic) chemical and/or detergent solution at a preferable temperature to the vessel 200 and recirculating through the feed/recirculation tank 124 for a pre-determined period. Thereafter, the system 100 is purged of chemical solution and put back in service after sufficient cleaning, as determined by the recovered flux at the given pressure. Alternatively, a certain amount of chemical solution is introduced to the vessel 200 through the designated CIP feed connection. The CIP solution is distributed via the trough 394 over the surface of the membranes 530. Significantly, the vessel is not filled to capacity during the CIP process. Rather, a lesser amount of CIP solution is distributed. The discs 500 are then rotated to further disperse the CIP solution over the membrane surface area. Compressed air is injected into the vessel 200 through the compressed air injection port 320 to provide pressure and further force the CIP solution through the membranes.

Figure 21:
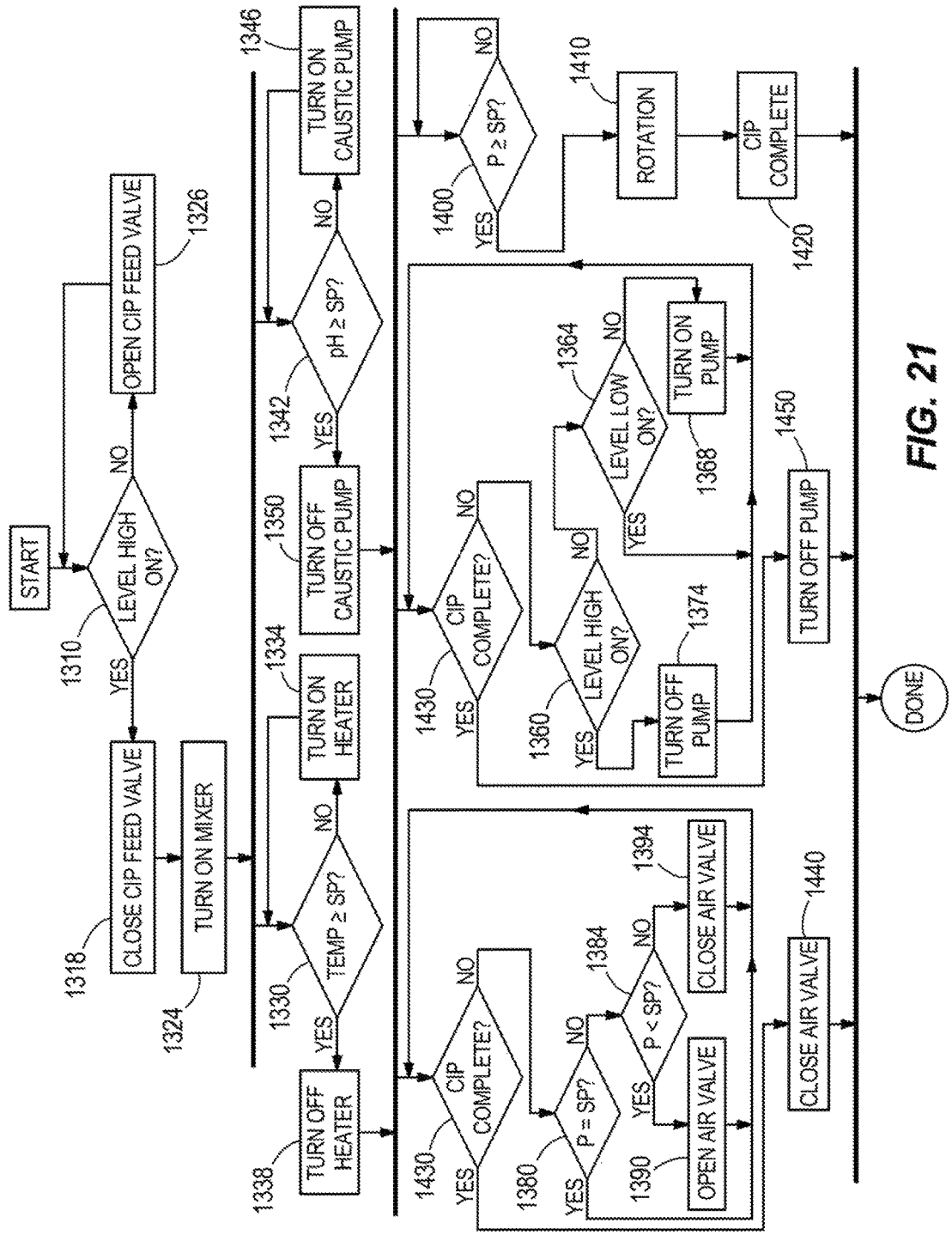
FIG. 21 is a schematic view of an operational caustic CIP sequence of the treatment system of FIG. 1.

With reference to FIG. 21, a specific caustic CIP process is illustrated. Staring with the level sensor 150 in the tank 124 (step 1310), with a level sensor "high" condition the feed valve 122 is closed (step 1318) and the mixer 156 activated (step 1324). If the level sensor "high" condition is not met, the feed valve 122 is opened to fill the tank 124 (step 1326). The temperature sensor 152 monitors the contents of the tank 124 (step 1330) and either turns on (step 1334) or off (step 1338) the heater 158 to adjust the feed temperature with respect to a CIP temperature setpoint (e.g., approximately 120 deg. F.).

The pH of the tank contents is compared to a CIP caustic setpoint (e.g., approximately pH of 12) (step 1342) and if not greater than the setpoint the caustic chemical pump 131A is activated (1346); if greater than the setpoint the caustic pump 131A is deactivated (step 1350).

The liquid level in the vessel 200 is ascertained from the level transmitter 350. If neither the "high" level (step 1360) nor the "low" level (step 1364) is triggered, the feed pump 128 is activated (step 1368). As the solution level in the vessel 200 rises, the feed pump 128 continues to provide CIP solution from the tank 124 until the "high" level is reached, at which point the feed pump 128 is deactivated (step 1374). The "high" and "low" levels are positioned relative to the vessel interior such that the "high" level may be well below one-half, one-quarter, or less of the total capacity of the vessel 200. In this particular application, the CIP process uses a minimal amount of solution, e.g., a 10,000 gallon capacity vessel may be cleaned with such a process using only 50 to 100 gallons of CIP solution.

Concurrently, the pressure inside the vessel 200 is maintained with the use of compressed air. Specifically, the pressure within the vessel 200 is monitored (step 1380), and if less than a CIP setpoint pressure (step 1384), the air inlet valve 322 is actuated or opened to allow the flow of compressed air inside the vessel 200 (step 1390). If the vessel pressure is greater than the CIP setpoint pressure, the air inlet valve 322 is closed (step 1394). Once the pressure is greater than the CIP setpoint (step 1400), the drive 220 is activated to rotate the discs 500 for a predetermined time (step 1410), after which the CIP sequence is complete (step 1420). Once complete (steps 1430) the inlet valve 322 is closed (step 1440) and the feed pump 128 is deactivated (step 1450).

Figure 22:
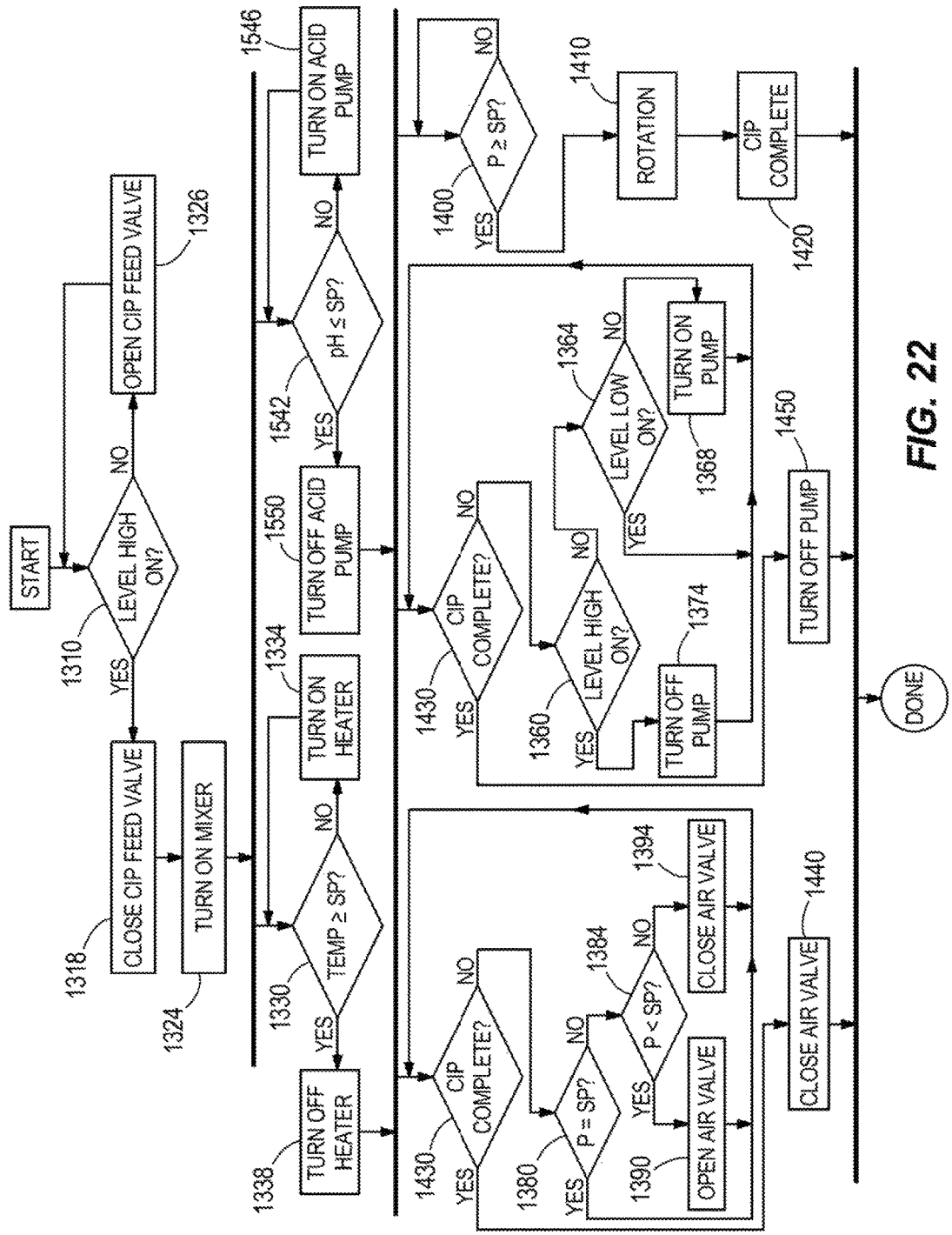
FIG. 22 is a schematic view of an operational acid CIP sequence of the treatment system of FIG. 1.

With reference to FIG. 22, a specific acid CIP process is illustrated, with like steps sharing like numbers with the aforementioned caustic CIP process illustrated in FIG. 21. With the tank 124 level sensor(s) 150 and temperature sensor 152 operating as previously described, the pH of the tank contents is compared to a CIP acid setpoint (e.g., approximately pH of 2) (step 1542) and if not greater than the setpoint the acid chemical pump 131B is activated (1546); if greater than the setpoint the acid pump 131B is deactivated (step 1550). The remainder of the acid CIP process is as previously described for the caustic CIP process.

A membrane cartridge 400 that has passed its useful life can be removed from the vessel 200 and replaced with another one. Specifically, a membrane cartridge 400 removed from a vessel 200 can be shipped, transported, or otherwise sent to a local or remote facility and cleaned, or instead some or all of the membranes 530, permeate carriers 518, or discs 514 replaced, repackaged, and shipped back to the same system or to another system in another location.

To remove the membrane cartridge assembly 400 from the vessel 200, the operator essentially reverses the operation previously described. The flange 382 (with conduit section 384 and valve 386) is loosened and removed from the external flange 358, thereby exposing the locking nut 390. By loosening the locking nut 390, the permeate tube 610 of each assembly 400 is no longer engaged with the drive support shaft 364. The operator pulls the cartridge assembly 400 out of the vessel 200 along the mounting rails 396. A new or cleaned cartridge assembly 400 can then be inserted as previously described.

In certain embodiments, the system 10 may be used for water treatment, wastewater treatment, sea water treatment, landfill leachate, fracking water, clarification of sweeteners, product recovery, chemical and solvent clarification, catalyst recovery, oil/water separation, juice, wine and beer clarification, pre filtration for a follow-on process, and the like.

While the above describes example embodiments of the present disclosure, these descriptions should not be viewed in a limiting sense. Rather, several variations and modifications can be made without departing from the scope of the present disclosure.

What is claimed is:

1. A high velocity cross flow dynamic membrane filtration system comprising:
   a disc membrane assembly including
      a frame,
      at least two support shafts, each support shaft defining a longitudinal axis about which is positioned a plurality of axially spaced membrane discs, each shaft further coupled to the frame, and
      a permeate tube coupled to each support shaft and in fluid communication with the membrane discs associated with that support shaft;
   a vessel defining a treatment chamber and configured to removably support the disc membrane assembly within the treatment chamber, the vessel further including a wall; and
   a drive system,
   wherein the permeate tubes are configured to extend through a portion of the vessel wall when the disc membrane assembly is positioned within the treatment chamber, the permeate tubes further configured for rotation by the drive system,
   wherein the frame includes first and second end members, and wherein a plurality of rails extend between the first and second end members, the plurality of rails oriented generally parallel to the permeate tubes, and
   wherein the vessel further includes a plurality of mounting rails affixed to the vessel interior, each mounting rail configured to each receive a rail of the frame.

2. The system of claim 1, wherein the at least two support shafts comprise a first support shaft and a second support shaft, and wherein a plurality of membrane discs associated with the first support shaft are interspersed between a plurality of membrane discs associated with the second support shaft.

3. The system of claim 1, wherein the permeate tubes are further configured for clockwise and counterclockwise rotation.

4. The system of claim 1, further including a plurality of hubs, each hub positioned about one of the at least two supporting shafts between two adjacent discs of the plurality of axially spaced membrane discs, each hub of the plurality of hubs including at least one aperture in fluid communication with the permeate tube associated with the one of the at least two supporting shafts.

5. The system of claim 4, wherein the plurality of hubs together at least partially define a permeate channel in parallel with the one of the at least two supporting shafts.

6. The system of claim 1, wherein the membrane discs of the plurality of axially spaced membrane discs each include a disc body constructed of a non-porous material.

7. A high velocity cross flow dynamic membrane filtration system comprising:
   a disc membrane assembly including
      a frame,
      at least two support shafts, each support shaft defining a longitudinal axis about which is positioned a plurality of axially spaced membrane discs, each shaft further coupled to the frame, and
      a permeate tube coupled to each support shaft and in fluid communication with the membrane discs associated with that support shaft;
   a vessel defining a treatment chamber and configured to removably support the disc membrane assembly within the treatment chamber, the vessel further including a wall; and
   a drive system,
   wherein the permeate tubes are configured to extend through a portion of the vessel wall when the disc membrane assembly is positioned within the treatment chamber, the permeate tubes further configured for rotation by the drive system,
   wherein the at least two support shafts comprise a first support shaft and a second support shaft, and wherein a plurality of membrane discs associated with the first support shaft are interspersed between a plurality of membrane discs associated with the second support shaft, and
   wherein the frame includes a baffle, the baffle positioned at least partially between the plurality of membrane discs associated with the first support shaft and the plurality of membrane discs associated with the second support shaft.

8. The system of claim 7, wherein the frame includes first and second end members, and wherein a plurality of rails extend between the first and second end members, the plurality of rails oriented generally parallel to the permeate tubes.

9. The system of claim 8, wherein the vessel further includes a plurality of mounting rails affixed to the vessel interior, each mounting rail configured to each receive a rail of the frame.

10. A high velocity cross flow dynamic membrane filtration system comprising:
    a disc membrane assembly including
       a frame,
       at least two support shafts, each support shaft defining a longitudinal axis about which is positioned a plurality of axially spaced membrane discs, each shaft further coupled to the frame, and
       a permeate tube coupled to each support shaft and in fluid communication with the membrane discs associated with that support shaft;
    a vessel defining a treatment chamber and configured to removably support the disc membrane assembly within the treatment chamber, the vessel further including a wall; and
    a drive system, wherein the permeate tubes are configured to extend through a portion of the vessel wall when the disc membrane assembly is positioned within the treatment chamber, the permeate tubes further configured for rotation by the drive system, and wherein the vessel includes a plurality of inlet ports and a plurality of outlet ports, and wherein the system is configured to selectively permit access to the vessel through each possible set or subset of the plurality of inlet ports in combination with each possible set or subset of the plurality of outlet ports.

11. The system of claim 10, wherein the plurality of inlet ports comprises three inlet ports and wherein the plurality of outlet ports comprises three outlet ports.

12. The system of claim 11, wherein the vessel has a vessel diameter orthogonal to a vessel length, and wherein the three inlet ports are aligned lengthwise of the vessel and wherein the three outlet ports are aligned lengthwise of the vessel.

13. A high velocity cross flow dynamic membrane filtration system comprising:
   a disc membrane assembly including
      a frame,
      at least two support shafts, each support shaft defining a longitudinal axis about which is positioned a plurality of axially spaced membrane discs, each shaft further coupled to the frame, and
      a permeate tube coupled to each support shaft and in fluid communication with the membrane discs associated with that support shaft;
   a vessel defining a treatment chamber and configured to removably support the disc membrane assembly within the treatment chamber, the vessel further including a wall; and
   a drive system,
   wherein the permeate tubes are configured to extend through a portion of the vessel wall when the disc membrane assembly is positioned within the treatment chamber, the permeate tubes further configured for rotation by the drive system,
   wherein the at least two support shafts comprise a first support shaft and a second support shaft, and wherein a plurality of membrane discs associated with the first support shaft are interspersed between a plurality of membrane discs associated with the second support shaft, and
   further including at least one plate coupled to the vessel or to the disc membrane assembly such that the at least one plate extends at least partially between the plurality of axially spaced membrane discs of the first support shaft and the plurality of axially spaced membrane discs of the second support shaft when the disc assembly is positioned within the treatment chamber.

14. The high velocity cross flow dynamic membrane filtration system of claim 1, wherein each membrane disc includes
   a disc body presenting a first surface and an opposing second surface,
   a first permeate carrier in direct contact with the first surface and a second permeate carrier in direct contact with the second surface, and a first filtration membrane in direct contact with the first permeate carrier and a second filtration membrane in direct contact with the second permeate carrier.

15. The disc membrane assembly of claim 14, wherein the first and second filtration membranes are porous membranes.

16. The disc membrane assembly of claim 14, wherein the disc body is a nonporous disc body.

17. The disc membrane assembly of claim 14, wherein the disc body further includes a peripheral lip adjacent an outer edge, and wherein the first permeate carrier and the first filtration membrane are positioned such that the first filtration membrane is approximately flush with an outer surface of the peripheral lip.

* * * * *